(12) United States Patent
Mishima et al.

(10) Patent No.: US 6,679,546 B2
(45) Date of Patent: Jan. 20, 2004

(54) FRONT BODY STRUCTURE OF VEHICLE

(75) Inventors: Takashi Mishima, Hiroshima (JP); Takayuki Kimura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/166,028

(22) Filed: Jun. 11, 2002

(65) Prior Publication Data

US 2002/0195840 A1 Dec. 26, 2002

(30) Foreign Application Priority Data

Jun. 12, 2001 (JP) .................................... 2001-176970
Aug. 23, 2001 (JP) .................................... 2001-252206

(51) Int. Cl.⁷ .................................................. B60J 7/00
(52) U.S. Cl. ............................ 296/203.01; 296/203.02; 296/203.04; 296/204
(58) Field of Search .................... 296/203.01, 203.02, 296/203.03, 204, 194, 188, 189, 192, 193, 30, 186; 280/779; 180/274

(56) References Cited

U.S. PATENT DOCUMENTS

| | | | | |
|---|---|---|---|---|
| 3,765,715 A | * | 10/1973 | Franchini .................... 296/188 |
| 4,362,319 A | * | 12/1982 | Masaki et al. .............. 280/779 |
| 4,365,826 A | * | 12/1982 | Iriyama ....................... 296/193 |
| 4,671,536 A | * | 6/1987 | Yoshimura .................. 280/779 |
| 4,682,788 A | * | 7/1987 | Yoshimura .................. 280/779 |
| 4,767,153 A | * | 8/1988 | Kawasaki et al. .......... 296/194 |
| 4,840,424 A | * | 6/1989 | Asoh .......................... 296/204 |
| 4,930,836 A | | 6/1990 | Grinn |
| 5,586,799 A | * | 12/1996 | Kanemitsu et al. .... 296/203.02 |
| 5,611,593 A | * | 3/1997 | Fukagawa et al. .......... 296/204 |
| 5,663,520 A | * | 9/1997 | Ladika et al. ............... 296/204 |
| 5,921,618 A | * | 7/1999 | Mori et al. ............. 296/203.01 |
| 6,168,228 B1 | * | 1/2001 | Heinz et al. ........... 296/203.03 |
| 6,203,099 B1 | * | 3/2001 | Iwatsuki ...................... 296/204 |
| 6,270,152 B1 | * | 8/2001 | Sato ....................... 296/203.02 |
| 6,270,153 B1 | | 8/2001 | Toyao et al. |
| 6,276,483 B1 | * | 8/2001 | Sinnhuber et al. .......... 180/274 |
| 6,315,347 B1 | * | 11/2001 | Gotz ....................... 296/203.02 |
| 6,447,041 B1 | * | 9/2002 | Vandersluis et al. ........ 296/194 |
| 6,460,918 B1 | * | 10/2002 | Sato et al. .............. 296/203.04 |
| 2001/0019216 A1 | * | 9/2001 | Kobayashi ................... 296/204 |
| 2001/0030450 A1 | * | 10/2001 | Miyasaka .................... 296/204 |
| 2002/0038965 A1 | * | 4/2002 | Palazzolo et al. ........... 296/208 |
| 2002/0093221 A1 | * | 7/2002 | Forssell et al. ........ 296/203.02 |

FOREIGN PATENT DOCUMENTS

JP     2-20423 A     1/1990
JP     2000-238667 A     5/2000

* cited by examiner

Primary Examiner—Kiran Patel
(74) Attorney, Agent, or Firm—Nixon Peabody LLP; Donald R. Studebaker

(57) ABSTRACT

The present invention provides a front body structure of a vehicle having a dash panel extending in a vertical direction and constituting a front end wall of a crew's cabin, a floor panel continuously extending rearward from the dash panel, and a tunnel portion protruding upward and extending in a longitudinal direction of the vehicle. The tunnel portion is provided in a substantially center portion of the floor panel. The dash panel is provided with a dash cross member structured such that one end portion is jointed to a side surface of the tunnel portion, a middle portion extends in the vehicle widthwise direction along the dash panel, and another end portion is connected to a hinge pillar inner, thereby restraining backward movement of the dash panel at a time of a head-on collision and restraining intrusion of a side-sill or doors at a time of a side collision.

17 Claims, 23 Drawing Sheets

FRONT BODY STRUCTURE OF VEHICLE

BACKGROUND OF THE INVENTION

1. Field of the Invention

The present invention relates to a front body structure of a vehicle which is provided with a dash panel extending in a vertical direction and forming a front end wall of a crew's cabin, a floor panel continuously extending rearward from the dash panel, and a tunnel portion protruding upward, in a substantially center portion of the floor panel, and extending in a longitudinal direction of the vehicle.

2. Description of the Prior Art

In conventional, as disclosed in U.S. Pat. No. 4,930,836 corresponding to Japanese Patent Laid-Open Publication No. Hei 2-20423, there has been disclosed a body structure of a vehicle in which a door-opening is provided in a side body, and the door-opening is opened and closed by a front door and a rear door which constitute a free-style type door.

In the prior art, a door opening with a center pillar less structure is formed in a side body of the vehicle. And, a front door is supported to open and close via front door hinges on a front line portion of the door-opening, while a rear door is supported to open and close via rear door hinges on a rear line portion of the door-opening.

When applying the above-mentioned free-style type of door with the center pillar less structure to an automobile and setting a door-opening size thereof to be larger in order to secure the convenience in getting on and off the vehicle, it is desired to develop a vehicle body with sufficient high body rigidity. Because, in this case, the door-opening is considerably large, and in addition to this fact, a hinge pillar should bear a load when an enlarged door is opened and closed.

Further, in conventional, as a vehicle body structure of a vehicle, as disclosed in Japanese Patent Laid-Open Publication No. 2000-238667, there has been disclosed a body structure of a vehicle which is provided with a floor tunnel portion protruding upward and having a bottom-open reverse U-shaped cross sectional structure, and a supplementary frame (tunnel member) provided in an upper part of the floor tunnel portion and having a closed cross sectional structure.

When applying such a vehicle body structure to a vehicle body having free-style type doors with a center pillar less structure, it is possible to improve a floor rigidity and a body rigidity of the vehicle. However, in this case, it is difficult to restrain a backward movement of a dash panel at a time of a head-on collision of the vehicle, also it is difficult to restrain a intrusion amount of a side-sill or doors into a crew's cabin at a time of a side collision of the vehicle.

Furthermore, in this case, so as to transmit a collision load to the floor tunnel portion at a time of a head-on collision of the vehicle, a front extension portion for connecting the supplementary frame (tunnel member) to the front side-frame is required, so that there are problems that a number of parts and a number of assembling steps are increased, and the structure thereof becomes more complex.

SUMMARY OF THE INVENTION

An object of the present invention is to provide a front body structure of a vehicle which is capable of enhancing the body durability and restraining a backward movement of a dash panel at a time of a head-on collision of the vehicle, further capable of restraining a intrusion amount of a side-sill or doors into a crew's cabin at a time of a side collision of the vehicle.

Another object of the present invention is to provide a front body structure of a vehicle which is capable transmitting a collision load at a time of a head-on collision to the tunnel portion in spite of a simple structure, thereby improving durability at a time of collision.

In accordance with a first aspect of the present invention, there is provided a front body structure of a vehicle including: a dash panel extending in a vertical direction and constituting a front end wall of a crew's cabin; a floor panel continuously extending rearward from said dash panel; and a tunnel portion protruding upward and extending in a longitudinal direction of the vehicle, said tunnel portion being provided in a substantially center portion of the floor panel, wherein said dash panel is provided with a dash cross member structured such that one end portion is jointed to a side surface of said tunnel portion, a middle portion extends in the vehicle widthwise direction along the clash lower panel, and another end portion is connected to a hinge pillar inner.

The above-mentioned dash panel may consist of a dash lower panel.

According to the structure mentioned above, since the dash cross member is arranged among the dash panel, the tunnel portion and the hinge pillar, it is possible to enhance the body durability by dispersing an input load of the dash panel into the tunnel portion and the hinge pillar via the dash cross member, at a time of a head-on collision of the vehicle. As a result, it is possible to restrain a backward movement of the dash panel.

Also, at a time of a side collision of the vehicle, it is possible to restrain a intrusion amount of a side-sill or doors into the crew's cabin by dispersing a side collision load into the tunnel portion via the dash cross member.

In one embodiment of the present invention, the above-mentioned dash cross member is provided so as to extend substantially in a horizontal vehicle widthwise direction at a predetermined height position upward apart from a height of a horizontal part of the floor panel.

In this case, since the height position of the dash cross member is set to the above-mentioned predetermined height position, it is possible to enhance the rigidity (or strength) of the hinge pillar by means of the dash cross member. Especially, it is possible to enhance the durability against a side collision.

In one embodiment of the present invention, a tunnel member extending in the longitudinal direction of the vehicle along the tunnel portion to form a closed cross section is provided on a surface of the tunnel portion.

In this case, it is possible to enhance the rigidity of the floor and the vehicle body by arranging the tunnel member.

In one embodiment of the present invention, the dash cross members are arranged so as to constitute a pair of right and left pieces, and each of the right and left dash cross members is jointed to the tunnel member provided on the surface of the tunnel portion.

In this case, at a time of a side collision in either right side or left side, it is possible to disperse a collision load to the tunnel member via the hinge pillar and the dash cross member, and to receive the collision load by the high rigid tunnel member. As a result, it is possible to restrain more effectively the intrusion amount of the side-sill or the doors into the crew's cabin.

In one embodiment of the present invention, the tunnel member is arranged all along the length of the tunnel portion in the longitudinal direction of the vehicle, and a front end portion of said tunnel member is connected to the dash panel.

In this case, it goes without saying that it is possible to further enhance the floor rigidity and the vehicle body rigidity by the tunnel member extending all along the length of the tunnel portion. Since the front end portion of the tunnel member is connected to the dash panel, it is possible to remarkably enhance the body durability by dispersing an input load of the dash panel into the tunnel portion and the hinge pillar via the dash cross member, at a time of a head-on collision of the vehicle.

In one embodiment of the present invention, a rear end of a front side-frame is connected to such a portion that corresponds to a connected portion by the dash cross member in the outer side surface of said dash panel.

In this case, at a time of a head-on collision, it is possible to disperse a transmitted load from the front side-frame to the tunnel portion and the hinge pillar via the dash panel and the dash cross member. Thereby, it is possible to enhance the durability and the rigidity of the vehicle body.

In one embodiment of the present invention, a door-opening is formed in a side portion of said vehicle, and said door-opening is provided with an annular reinforcement which integrally and continuously extends in an annular manner along said door-opening.

In this case, by arranging the annular reinforcement, it is possible to enhance the body rigidity and the torsional rigidity of the vehicle body, and to enhance the operating stability of the vehicle.

In one embodiment of the present invention, the end portion in the hinge pillar side of the dash cross member is jointed to the annular reinforcement via the hinge pillar inner.

In this case, by jointing the end portion in the hinge pillar side of the dash cross member to the high rigid annular reinforcement, it is possible to remarkably enhance the body rigidity and to enhance the durability against a head-on collision load and a side collision load.

In one embodiment of the present invention, the door-opening is opened and closed by a free-style type door consists of a front door supported by a hinge at a front portion thereof and a rear door supported by a hinge at a rear portion thereof.

In this case, the above-mentioned effects are shown more satisfactorily with respect to a vehicle having free-style type doors. Especially, since the hinge pillar supporting the front portion of the front door via a hinge is reinforced by the dash cross member, it is possible to secure a sufficient supporting rigidity of the front door even if the door-opening and the front door is set to be large.

In accordance with a second aspect of the present invention based on the first aspect of the same, there is provided a front body structure of a vehicle, wherein a front frame extending in the longitudinal direction of the vehicle is arranged in a front side of the dash panel, and a rear end portion of the front frame extends in a vehicle widthwise direction to extend rearward along an outer side surface of the tunnel portion, and forms a closed cross sectional portion with respect to the tunnel portion to be jointed to the tunnel portion.

The dash panel having the structure mentioned above may correspond to a dash lower panel, and the front frame having the structure mentioned above may correspond to a front side-frame.

It is to be noted that the "back surface" of the tunnel portion means a reverse surface of a plate-like member forming the tunnel member, and the back surface faces to outer side of the crew's cabin. On the other hand, the "surface" or "upper surface" of the tunnel portion means a surface of a plate-like member forming the tunnel member, and the surface (or upper surface) faces to inner side of the crew's cabin.

According to the structure mentioned above, the rear end portion of the front frame extending in the vehicle widthwise direction is jointed to the back surface of the tunnel portion. And the closed cross section is formed between the rear end portion of the front frame and the tunnel portion. Therefore, it is possible to transmit a load at a time of a head-on collision from the front frame to the tunnel portion in spite of a simple structure, thereby, it is possible to improve durability at a time of a collision.

In one embodiment of the present invention, a tunnel member extending in the longitudinal direction of the vehicle along the tunnel portion to form a closed cross sectional portion is provided in an internal surface of the tunnel portion.

The tunnel member having the structure mentioned above may correspond to a high mount backbone frame.

In this case, it is possible to transmit the collision load at a time of the head-on collision to the tunnel portion and the tunnel member by arranging the tunnel member. Whereby, it is possible to further improve the durability at a time of the collision. And, simultaneously, it is possible to improve floor rigidity and vehicle body rigidity by arranging the tunnel member, and it is further possible to enhance a torsional rigidity of the front body of the vehicle.

In one embodiment of the present invention, the front frame rear end portion jointed to the outer side surface of the tunnel portion, and the tunnel member jointed to the internal surface of the tunnel portion are arranged to overlap in the longitudinal direction of the vehicle.

In this case, the durability of the vehicle body at a time of the collision is further improved by the overlapping structure as mentioned above.

In one embodiment of the present invention, the rear end portion of the front frame extends in the vehicle widthwise direction along the outer side surface of the dash panel to be jointed at least to a torque box.

In this case, since the load at a time of the collision is transmitted to a side-sill via the torque box and the load is also transmitted to the tunnel portion and the tunnel member, thereby making it possible to disperse the collision load, it is possible to restrict the deformation of the vehicle body.

In one embodiment of the present invention, the rear end portion of the front frame extends in the vehicle widthwise direction along the outer side surface of the dash panel, and the widthwise side portion thereof is jointed to a side-sill portion extending in the longitudinal direction of the vehicle.

In this case, since the load at a time of the collision is transmitted to the side-sill, the tunnel portion and the tunnel member, thereby making it possible to disperse the collision load, it is possible to restrict the deformation of the vehicle body.

In one embodiment of the present invention, the rear end portion of the front frame is connected to the floor frame which is jointed to a back surface of the floor panel to form a closed cross sectional portion and extends in the longitudinal direction of the vehicle.

In this case, the front frame is connected to the floor frame extending in the longitudinal direction of the vehicle. Therefore, it is possible to transmit and disperse the collision load not only to the tunnel portion but also to the floor frame forming the closed cross section with respect to the floor panel. As a result, it is possible to restrain more effectively the deformation of the vehicle body.

In one embodiment of the present invention, the tunnel portion is formed in a hat-like shaped cross section. The front frame is constituted by a pair of right and left frames, and rear end portions of a pair of right and left front frames form a pair of closed cross sectional portions in both corners in an upper portion of the tunnel portion.

In this case, a pair of right and left closed cross sectional portions are formed by the rear end portions of a pair of right and left front frames, and both corners in the upper part of the back surface in the tunnel portion formed in the hat-like shaped cross section (a portal cross section). Therefore, it is possible to enhance a vehicle body strength, and it is possible to intend to improve durability at a time of the collision, by the closed cross sectional structure.

In one embodiment of the present invention, the tunnel member is arranged all along the length of the tunnel portion, and a front end portion of the tunnel member is connected to the dash panel.

In this case, it goes without saying that it is possible to further enhance the floor rigidity and the vehicle body rigidity by the tunnel member extending all along the length of the tunnel portion. Since the front end portion of the tunnel member is connected to the dash panel, it is possible to restrict a backward movement of the dash panel at a time of the head-on collision of the vehicle.

DESCRIPTION OF THE PREFERRED EMBODIMENT

A description will be in detail given below of embodiments in accordance with the present invention with reference to the accompanying drawings.

Figure 1:
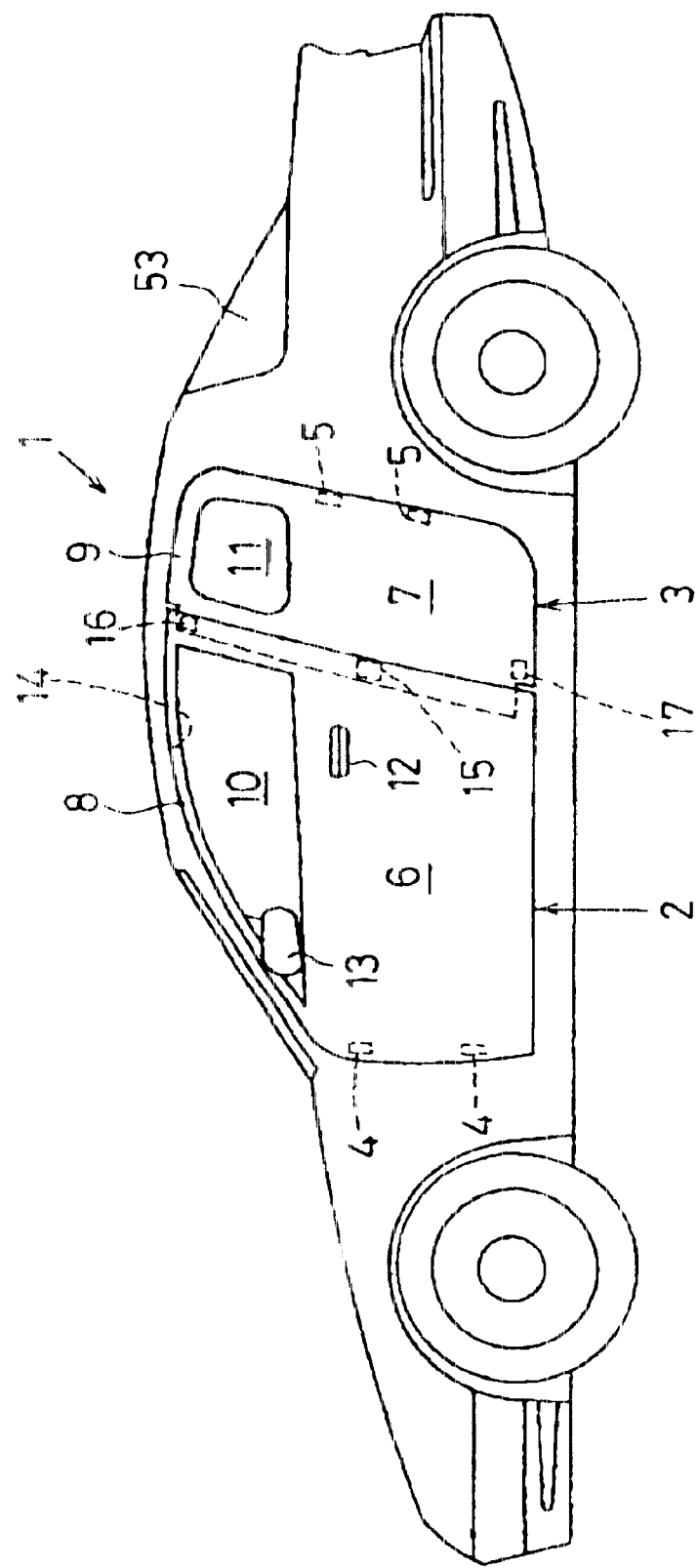
FIG. 1 is a side elevational view of a vehicle provided with a front body structure in accordance with a first embodiment of the present invention.

The drawings show a front body structure of a vehicle. FIGS. 1 to 16 show a first embodiment in accordance with the present invention. As shown in FIG. 1, a side door constituted by a front door 2 and a rear door 3 is provided in a side body of a vehicle 1. And, a front door hinge 4 and a rear door hinge 5 corresponding to hinge portions are respectively provided in a front end of the front door 2 and a rear end of the rear door 3, whereby the side door having a free-style type structure is constituted.

The front door 2 and the rear door 3 constituting the side door are respectively provided with a door panel 6 and 7, a door sash 8 and 9, and a window glass 10 and 11. Further, they are respectively provided with a side impact bar (not shown) extending in a longitudinal direction of the vehicle, in inner space of the above-mentioned door panel 6 and 7, in detail between door outer panel and door inner panel.

Furthermore, the front door 2 is provided with a door outer handle 12 for executing opening and closing operations of the front door 2 from external side of the vehicle, and a door mirror 13 for viewing a backward area of the vehicle.

The door having the free-style type structure in accordance with the present embodiment is constituted such that the front door 2 is preferentially opened and the rear door 3 is allowed to be opened after the front door 2 is opened.

The above-mentioned doors 2 and 3 cover a door opening 14 (refer to FIG. 7) so as to open and close it. As shown in FIG. 1, a lock member 15 is provided at a rear end of the front door 2, the lock member 15 is to be locked by a striker provided at a front end of the rear door 3. Lock members 16 and 17 are provided at upper and lower portions of the front end of the rear door 3. And the respective lock members 16 and 17 are constituted such as to be locked by strikers 44 and 69 (refer to FIGS. 8, 10 and 13) of the vehicle body mentioned below provided in an upper line portion and a lower line portion of the door opening 14.

Figure 2:
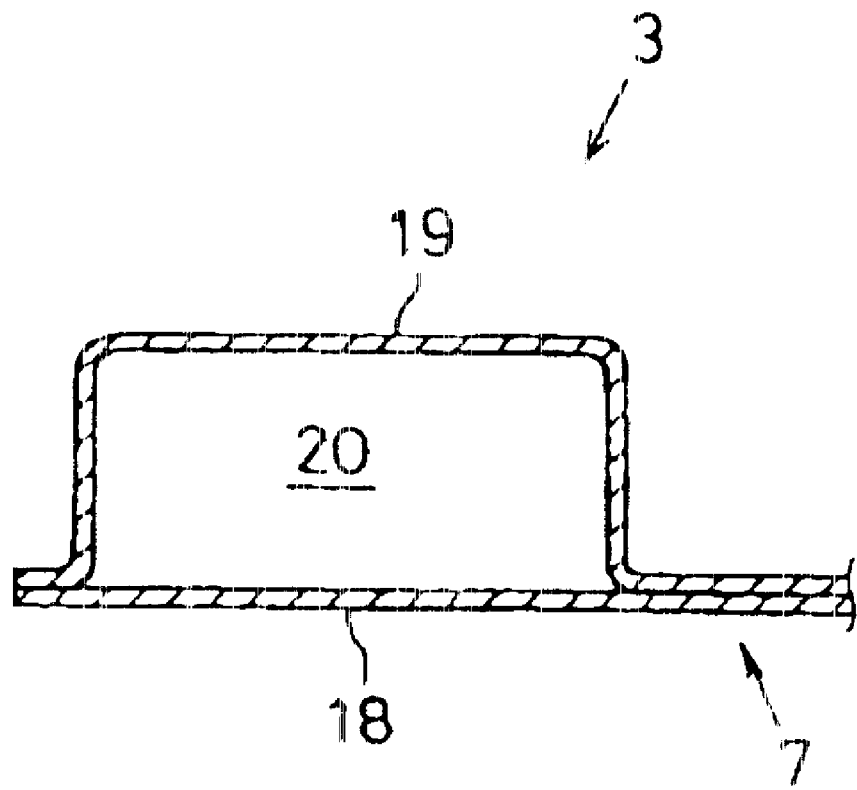
FIG. 2 is a cross sectional view of a front end portion of a rear door.

With respect to the rear door 3, a cross sectional portion of a front end thereof is shown in FIG. 2, a door inner reinforcement 19 as a door reinforcing member extending in a vertical direction is jointed to a front vertical line portion of a door outer panel 18. And, a closed cross sectional portion 20 extending in the vertical direction is formed by the both elements 18 and 19, thereby a so-called virtual center pillar is constituted.

Further, the above-mentioned striker at the front end of the rear door 3 and the upper lock member 16 (lock unit) are provided in this closed cross sectional portion. Furthermore, the lower lock member 17 (lock unit) is provided in the door inner reinforcement 19 or near the same.

A frame structure of the front body in plan view is will be explained by referring to FIG. 3.

The front body is provided with a pair of right and left front side-frames 21, 21. A floor frame 22 and a rear side-frame 23 extend rearward from each of those front side-frames respectively in a manner that they extend integrally with each front side-frame respectively.

Figure 3:
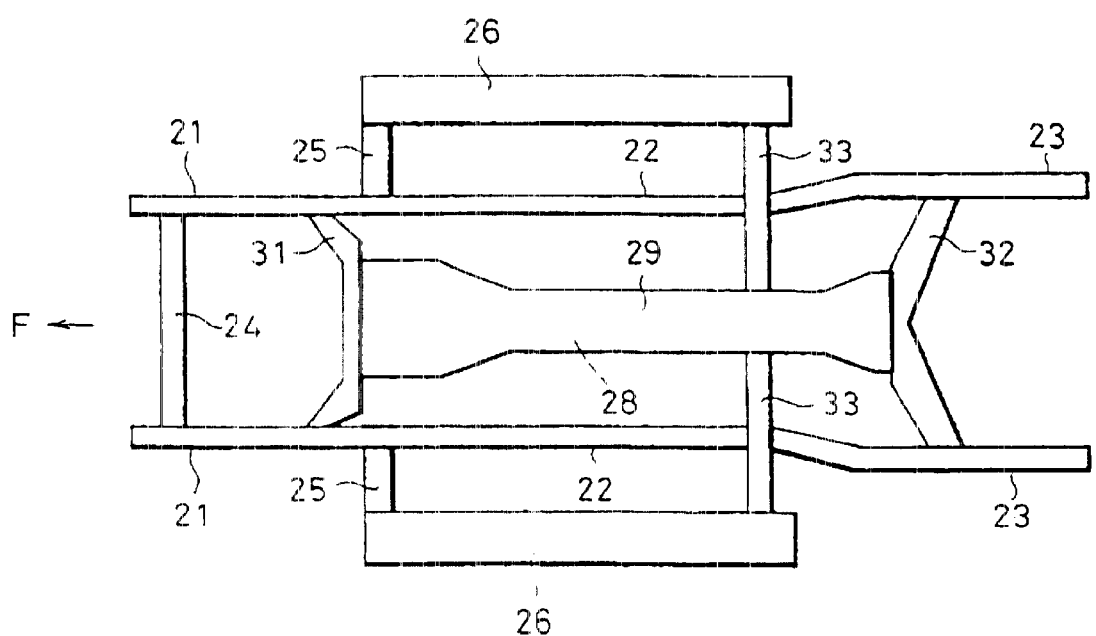
FIG. 3 is a plan view showing a frame structure of the front body structure.

As shown in FIG. 3, a front cross member (so-called No. 1 cross member) 24 extending in the vehicle widthwise direction is disposed between front portions of the above-mentioned front side-frames 21 and 21. Further, a torque box 25 extending in the vehicle widthwise direction is provided in an outer side of the rear portion of the front side-frame 21 to correspond to a lower part of the dash panel (refer to a dash lower panel 75 shown in FIG. 15). And a side-sill 26 extending in the vehicle longitudinal direction and substantially in parallel to the floor frame 22 is mounted to an outer end portion of the torque box 25.

Figure 4:
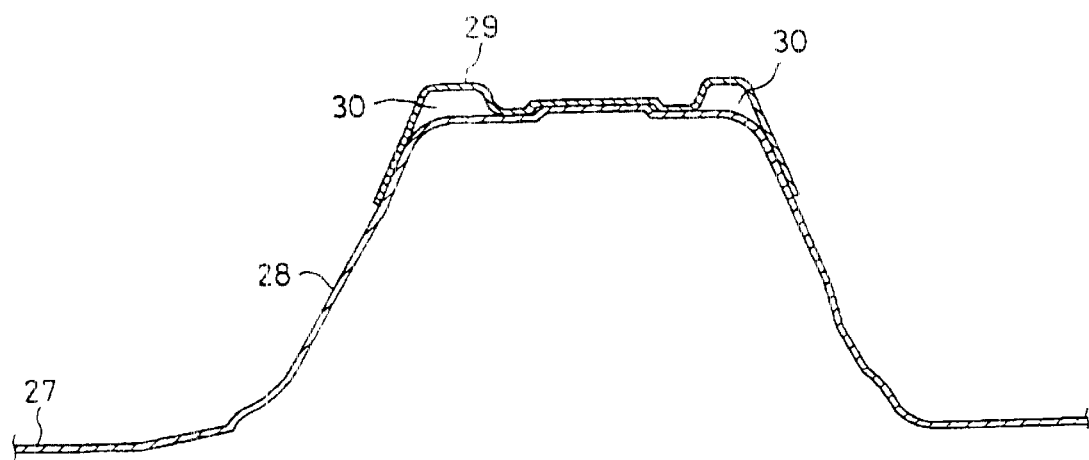
FIG. 4 is a cross sectional view of a tunnel portion.

As shown in FIG. 4, the tunnel portion 28 protruding upward and extending in the vehicle longitudinal direction is formed in a substantially center portion of the floor panel 27. Further, a tunnel member 29 (so-called high mount backbone frame) is mounted to an upper surface of the tunnel portion 28 all along the length of the tunnel portion 28. And, closed cross sectional portions 30 and 30 extending in the vehicle longitudinal direction are formed between the tunnel portion 28 and the tunnel members 29. Thereby, an improvement of the vehicle body rigidity is intended. It is to be noted that the above mentioned tunnel member 29 extends in the vehicle longitudinal direction along the tunnel portion 28.

The above-mentioned tunnel member 29 has a concavity shape in cross section so as to form a pair of closed cross section 30, 30 in associated with the tunnel portion 28. It is to be noted that the tunnel member may have such a shape to form only one closed cross section in associated with the tunnel portion.

Figure 5:
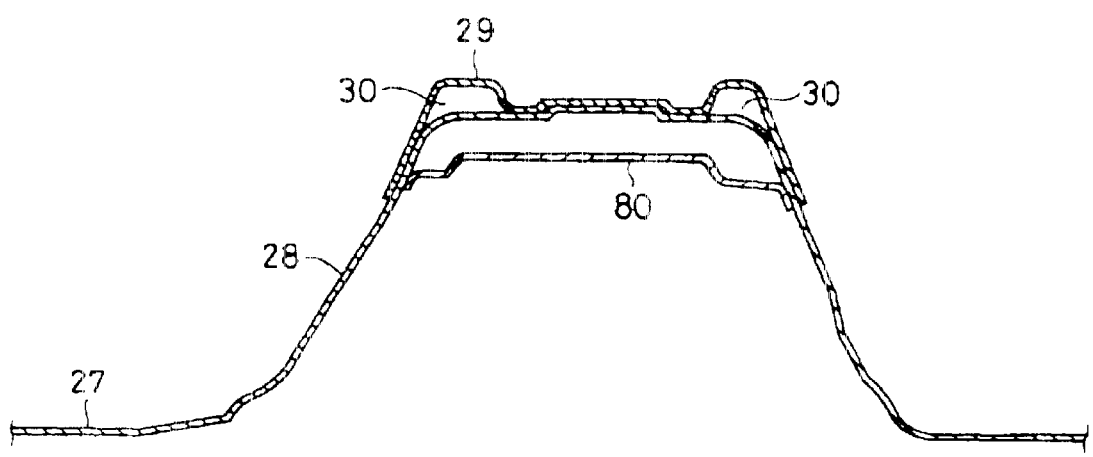
FIG. 5 is a cross sectional view of a tunnel portion and a vicinity thereof in accordance with a modified embodiment.
Figure 6:
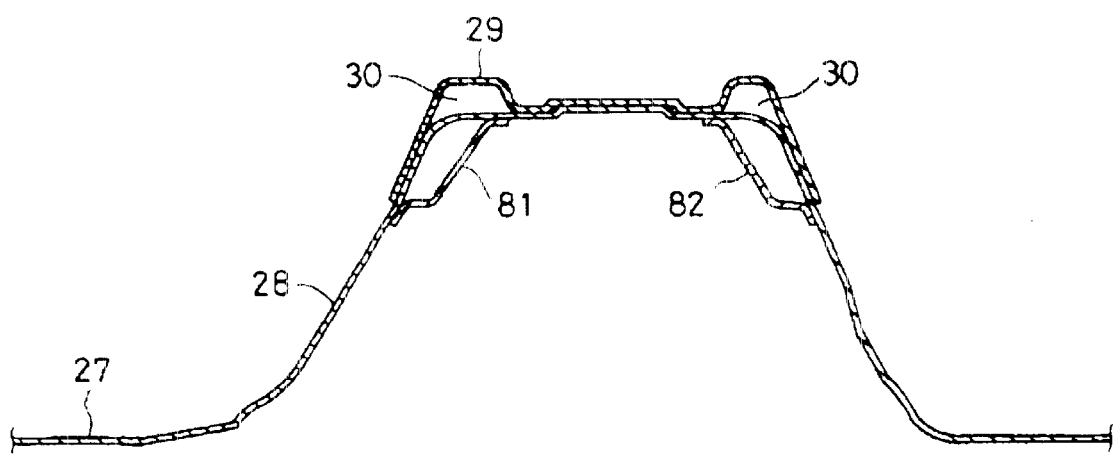
FIG. 6 is a cross sectional view of a tunnel portion and a vicinity thereof in accordance with another modified embodiment.

Further, as shown in FIG. 5, a tunnel reinforcement 80 may be arranged in the back side of the tunnel portion 28 at the upper portion thereof in a given length or all along the length of the tunnel portion. Furthermore, as shown in FIG. 6, tunnel reinforcements 81, 82 may be arranged in the back side of the tunnel portion 28 at the upper corner portions thereof in a given length or all along the length of the tunnel portion.

As shown in FIG. 3, a front end of the tunnel member 29 jointed and fixed to the upper surface of the tunnel portion 28 all along the length thereof is connected to the front side-frames 21, 21 by a front connection frame 31. And the rear end of the tunnel member 29 is connected to the rear side-frames 23, 23 by a rear connection frame 32.

Further, a rear portion of the side-sill 26 is connected to the tunnel portion 28 by a rear cross member 33 extending in the vehicle widthwise direction.

A collision energy at a time of a head-on collision is transmitted from the front side-frame 21 to the floor frame 22, and is transmitted to the side-sill 26 via the torque box 25. Further, the collision energy is transmitted to the tunnel portion 28 and the tunnel member 29 via the connection frame 31. Thereby, the collision energy mentioned above is dispersed into the floor frame 22, the side-sill 26, the tunnel portion 28 and the tunnel member 29. On the other hand, a collision energy at a time of a rear end collision is transmitted from the rear side-frame 23 to the floor frame 22, and is transmitted to the side-sill 26 via the cross member 33. Further, the collision energy is transmitted to the tunnel portion 28 and the tunnel member 29 via the connection frame 32. Thereby, the collision energy mentioned above is dispersed into the floor frame 22, the side-sill 26, the tunnel portion 28 and the tunnel member 29.

Next, a description will be given of a side body structure of the vehicle with reference to FIGS. 7 to 15.

Figure 7:
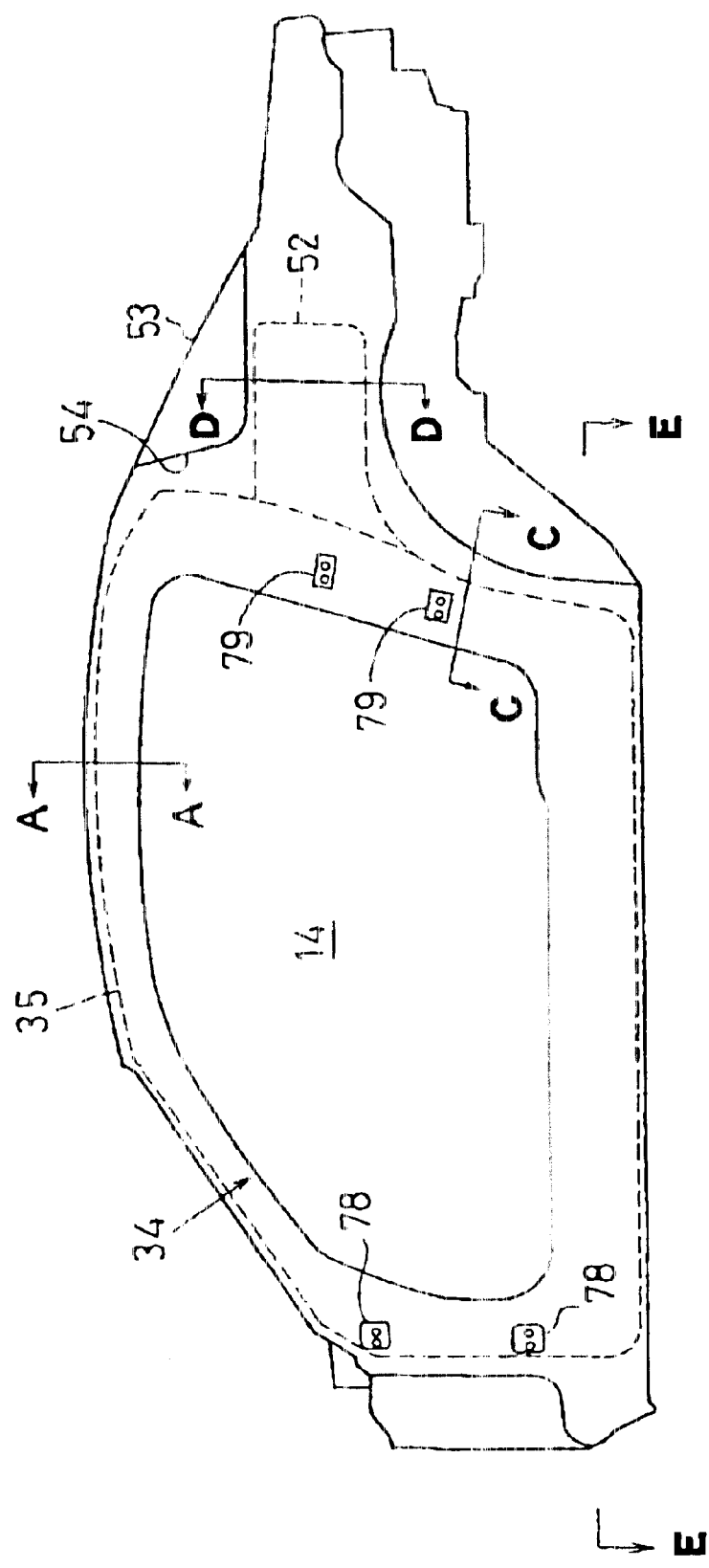
FIG. 7 is an enlarged side elevational view showing a cabin-side body.

FIG. 7 is a side elevational view of a cabin-side portion of the vehicle body. An annular door-opening member 34 is provided along the door opening 14 which is opened and closed by the front door 2 and the rear door 3 shown in FIG. 1.

The door-opening member 34 is constituted by a roof side rail outer, a front pillar outer, a hinge pillar outer, a side-sill outer and a rear pillar outer which correspond to a side outer panel, and a roof side rail inner, a front pillar inner, a hinge pillar inner, a side-sill inner and a rear pillar inner which correspond to a side inner panel.

An annular reinforcement 35 which integrally and continuously extends in an annular manner along the door opening 14 is provided within a closed cross sectional portion of the above mentioned door opening member 34. And a body rigidity and a torsional rigidity of the vehicle body is intended to be improved by the annular reinforcement 35.

Figure 8:
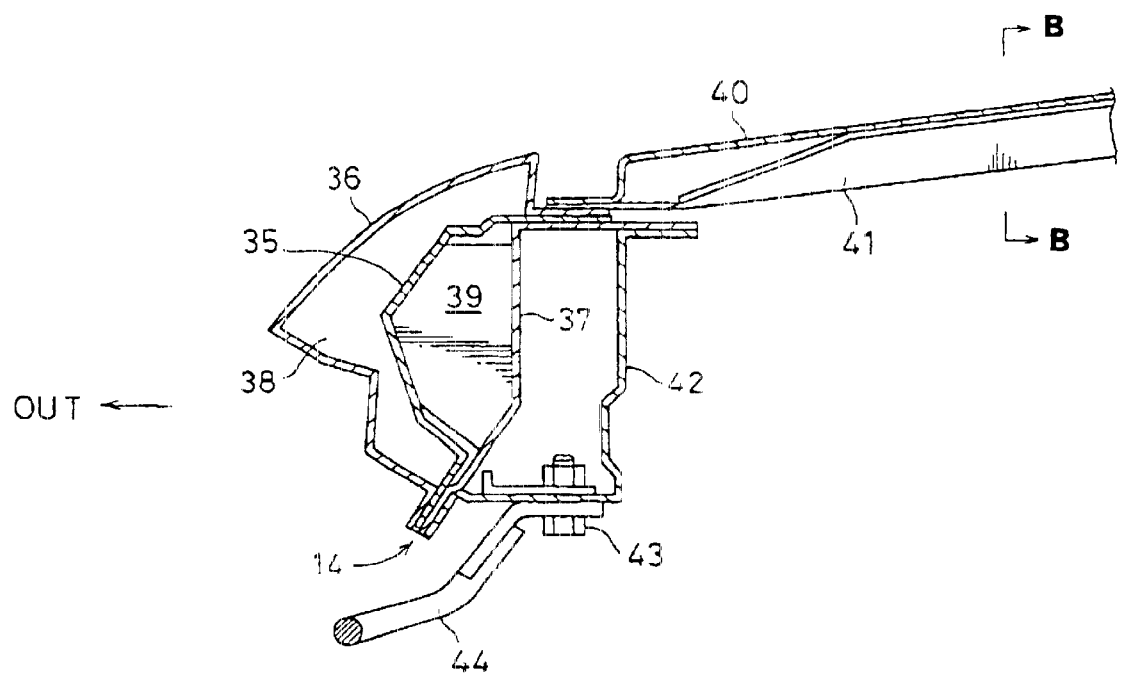
FIG. 8 is a cross sectional view as seen from a line A—A in FIG. 7.

FIG. 8 is a cross sectional view along a line A—A in FIG. 7. A closed cross sectional portion 38 extending in the longitudinal direction of the vehicle is formed by a roof side rail outer 36 and a roof side rail inner 37 jointed to an inner side of the roof side rail outer 36. And, the above mentioned annular reinforcement 35 is arranged so as to be jointed to the roof side rail outer 36 and the roof side rail inner 37 between them within the closed cross sectional portion 38.

Further, a node-type striker reinforcement 39 is disposed between the annular reinforcement 35 and the roof side rail inner 37. The striker reinforcement 39 is provided so as to correspond to a mounting portion of the striker 44 mentioned below.

Figure 9:
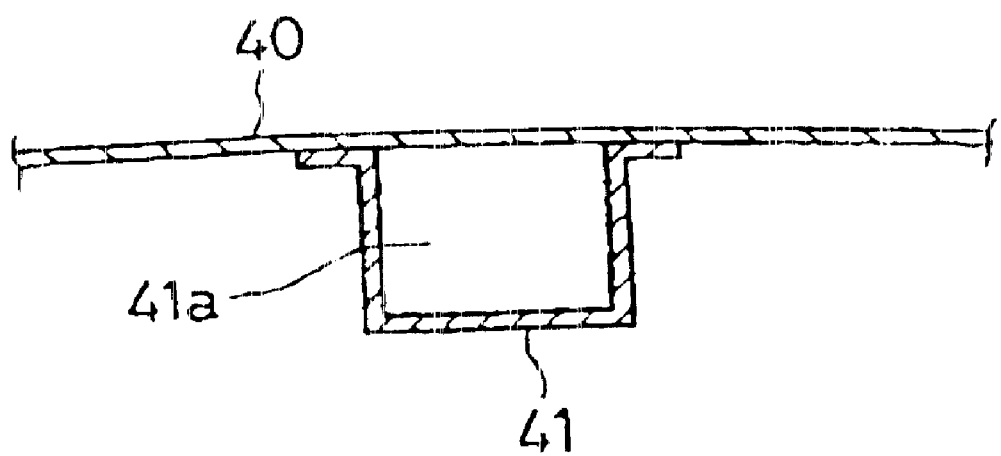
FIG. 9 is a cross sectional view as seen from a line B—B in FIG. 8.

A roof panel 40 is mounted to an upper jointing portion between the roof side rail outer 36 and the roof side rail inner 37. And a roof reinforcement 41 extending in the vehicle widthwise direction is jointed to a lower surface of the roof panel 40 as shown in FIG. 9. A closed cross sectional portion 41a extending in the vehicle widthwise direction is formed between those elements 40 and 41.

A reinforcing member 42 is disposed and fixed between an upper extension portion of the roof side rail inner 37 extending inward and a lower jointing portion of the roof side rail 36 and 37. A striker 44 is mounted to a lower surface of a horizontal portion of the reinforcing member 42 by using a mounting member 43 such as bolts, nuts or the like. The striker 44 is structured such as to engage a latch of the lock member 16 shown in FIG. 1. Further, the above-mentioned reinforcing member 42 corresponds to a reinforcing means for connecting between the door opening 14 and the roof panel 40.

Figure 10:
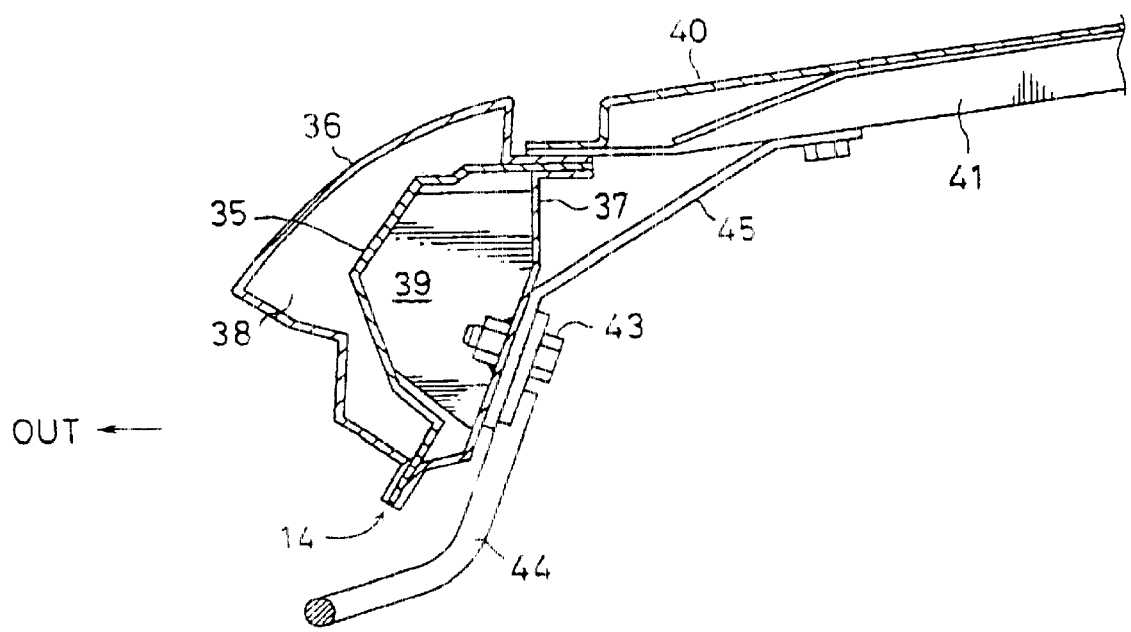
FIG. 10 is a cross sectional view showing another embodiment of a striker reinforcing structure.

It is to be noted that a structure shown in FIG. 10 may be employed in place of the structure shown in FIG. 8. That is, in the alternative structure a reinforcing stay 45 is provided as a reinforcing member for connecting between the roof reinforcement 41 and the roof side rail inner 37 in an obliquely crossing manner. The striker 44 may be mounted to such a portion that corresponds to the striker reinforcement 39 in the lower part of the reinforcing stay 45 by using the mounting member 43 such as bolts, nuts or the like.

Figure 11:
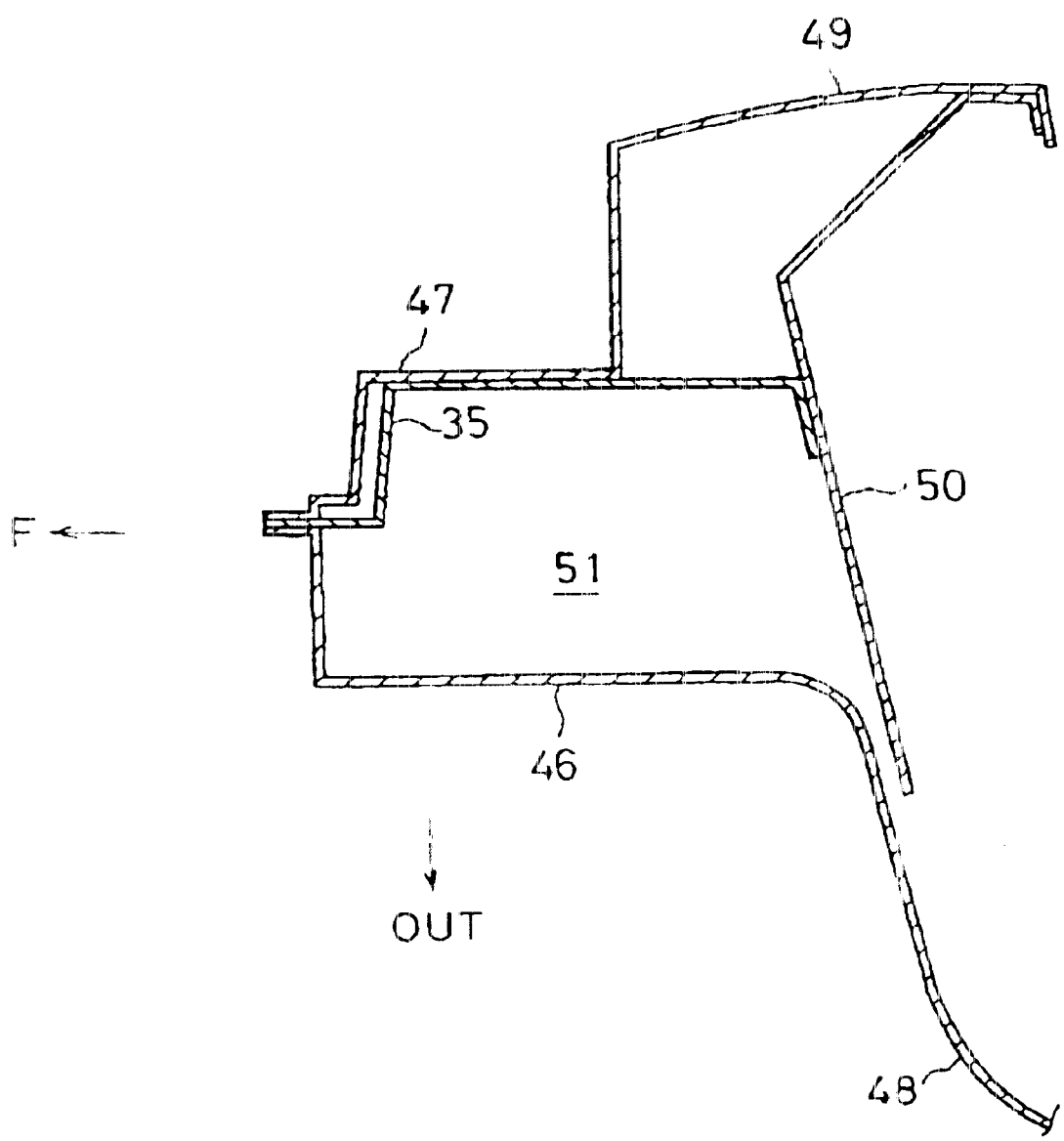
FIG. 11 is a cross sectional view as seen from a line C—C in FIG. 7.

FIG. 11 is a cross sectional view along a line C—C in FIG. 7. A rear pillar inner 47 is jointed to an inner side of the rear pillar outer 46. A rear fender 48 is continuously formed in a rear portion of the rear pillar outer 46, and a wheel house inner lower 49 is continuously formed in a rear portion of the rear pillar inner 47.

Further, a wheel house outer 50 is provided between the above-mentioned wheel house inner lower 49 and the rear fender 48, and there is formed a closed cross sectional portion 51 surrounded by the rear pillar outer 46, the rear pillar inner 47 and the wheel house outer 50.

And, the above-mentioned annular reinforcement 35 is arranged so as to be jointed between the rear pillar outer 46 and the rear pillar inner 47 within the closed cross sectional portion 51. In this rear pillar portion, a front portion of the above-mentioned annular reinforcement 35 is pinched and held by the jointing portion of the rear pillar 46 and 47, and a rear portion of the annular reinforcement 35 is jointed to the wheel house outer 50.

As shown in FIG. 7, a rear pillar reinforcement 52 extending rearward from the annular reinforcement 35 is provided in a rear line portion of the door-opening member 34.

As shown in FIG. 8, the rear pillar reinforcement 52 extends rearward along a lower line portion of an opening for a rear window 53 provided in a rear portion of the vehicle, that is, a rear window opening 54. And, as shown in FIG. 13, a rear end portion 52a of the rear pillar reinforcement 52 is connected to a rear package tray upper member 55 arranged in the vehicle widthwise direction in a lower line portion of the rear window opening 54.

Figure 12:
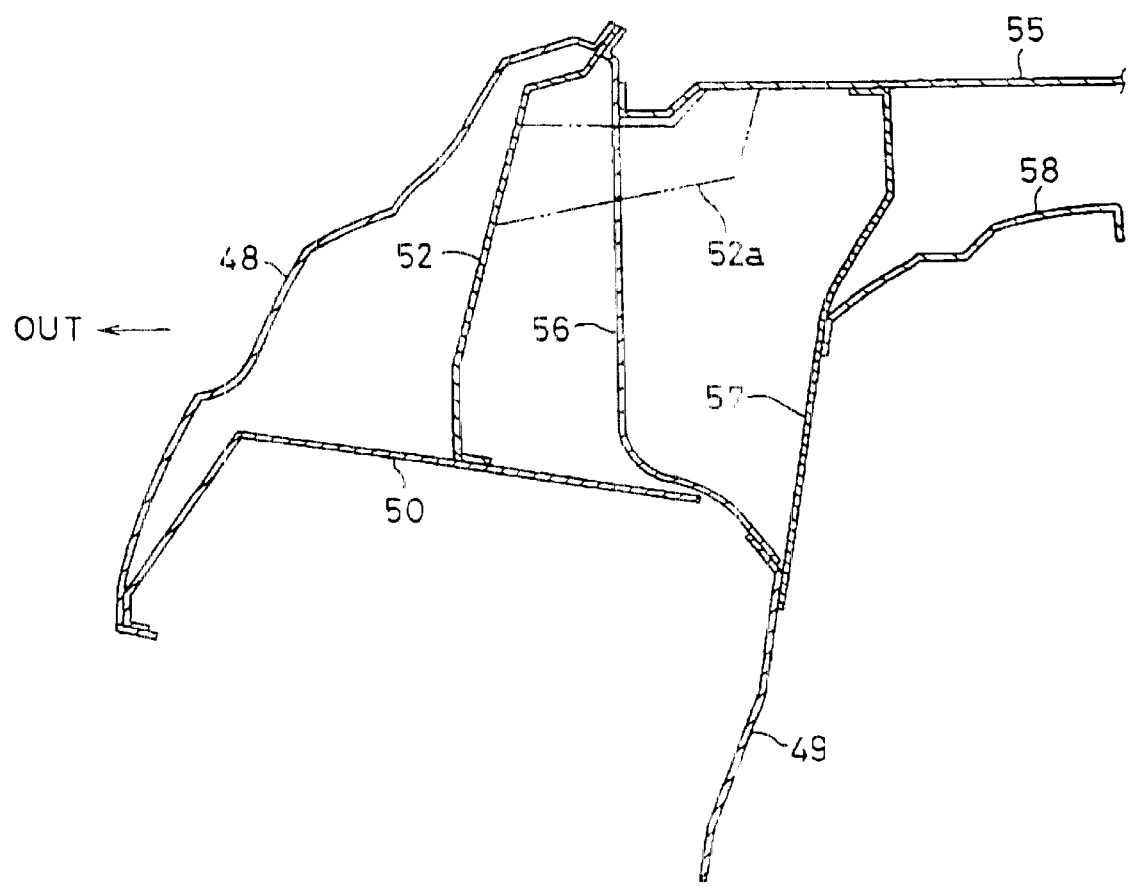
FIG. 12 is a cross sectional view as seen from a line D—D in FIG. 7.

FIG. 12 is a cross sectional view along a line D—D in FIG. 7. The above-mentioned rear pillar reinforcement 52 is mounted to the crew's cabin side (inner side) of the rear fender 48 so as to be directed substantially in a vertical direction. And a wheel house inner upper 56 is mounted to the crew's cabin side (inner side) of the rear pillar reinforcement 52. Further, the wheel house outer 50 is provided between a lower internal surface of the rear fender 48 and a lower part of the wheel house inner upper 56, and a lower end of the above-mentioned rear pillar reinforcement 52 is jointed and fixed to the wheel house outer 50.

The rear package tray upper member 55 substantially horizontally extending in the vehicle widthwise direction is laid across between upper parts of the right and left wheel house inner uppers 56. And a rear package lower gusset plate 57 is mounted between a lower surface of the rear package tray upper member 55 and the wheel house inner lower 49. Further, a reinforcing gusset plate 58 extending to the crew's cabin side (extending inward) is mounted to a middle part of the rear package lower gusset plate 57.

Figure 13:
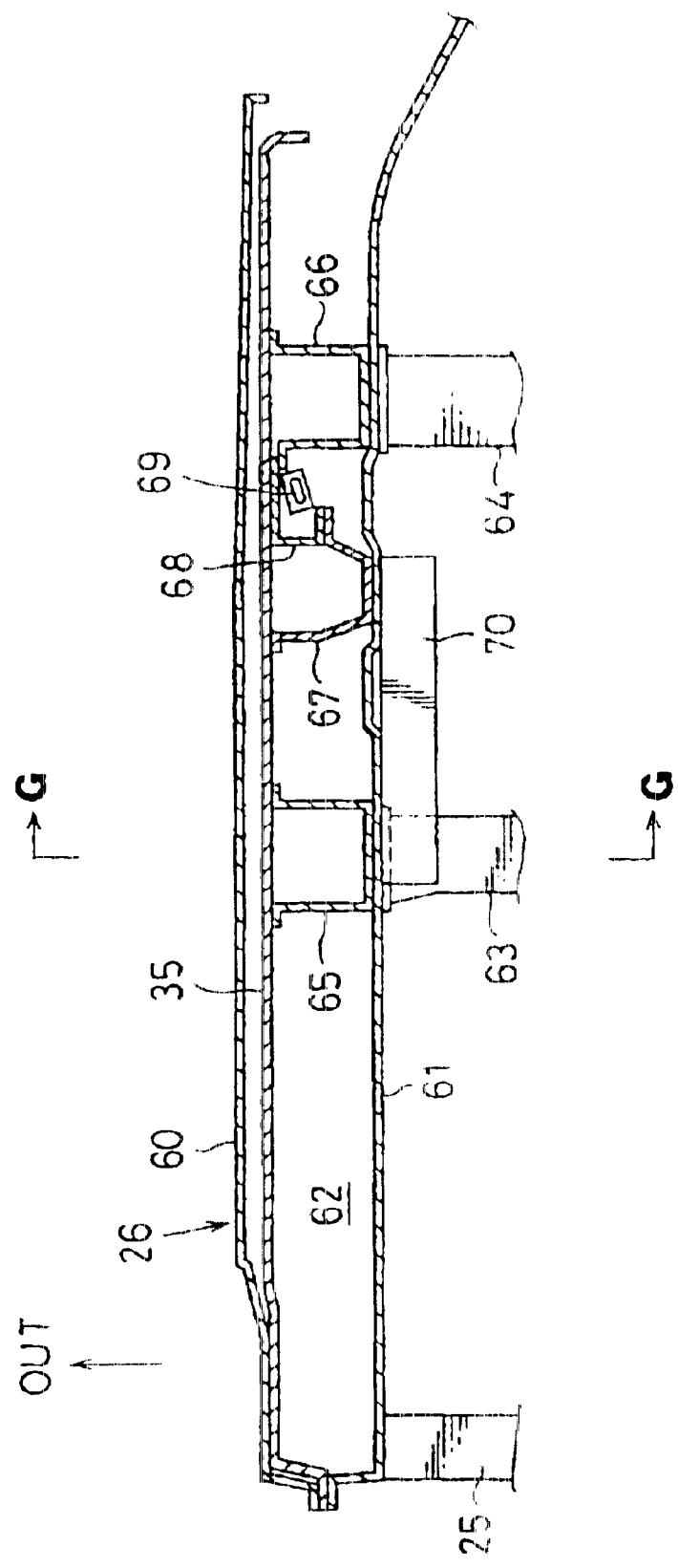
FIG. 13 is a cross sectional view of a side-sill portion corresponding to a view as seen from a line E—E in FIG. 7.
Figure 14:
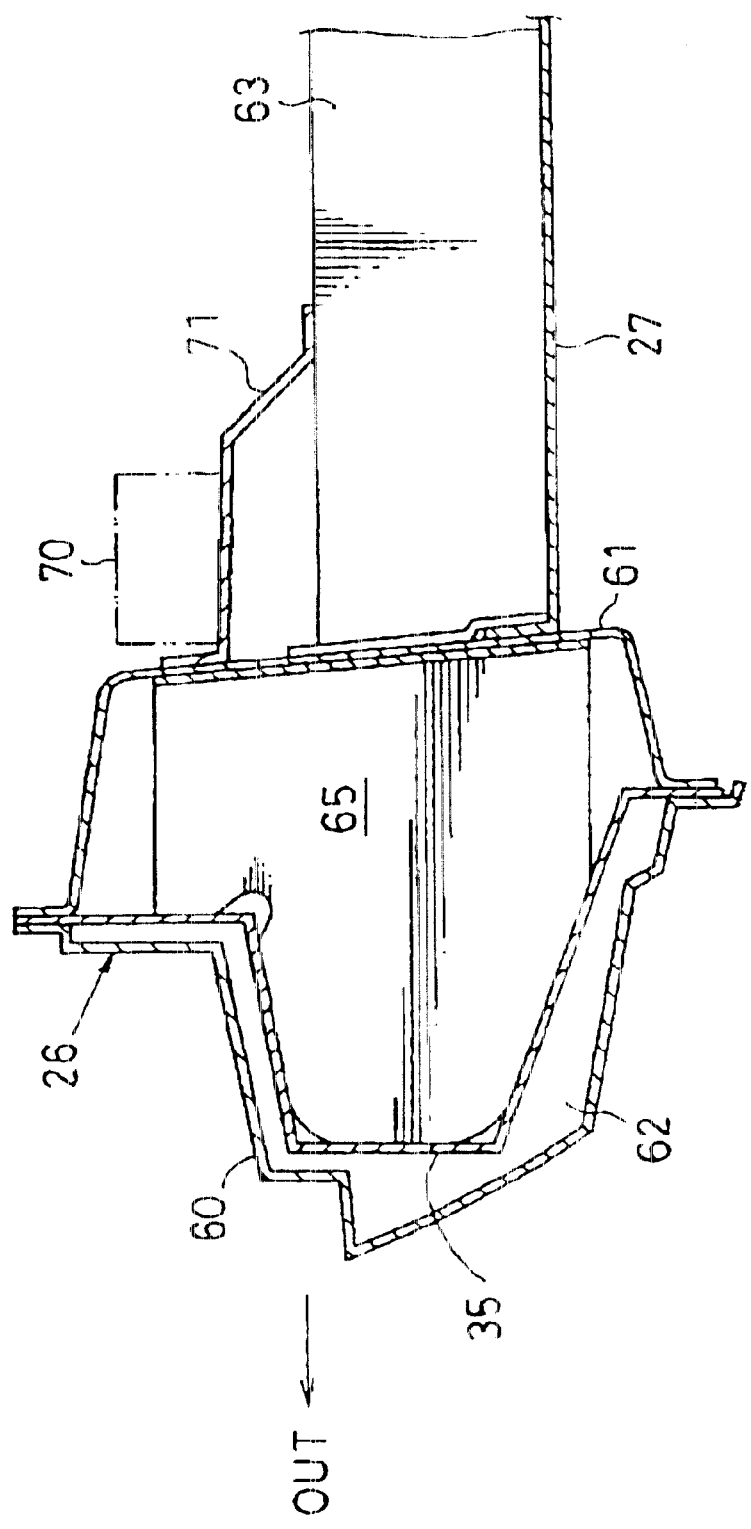
FIG. 14 is a cross sectional view as seen from a line G—G in FIG. 13.

FIG. 13 is a cross sectional view (in this case, showing a right side) corresponding to a view as seen from a line E—E in FIG. 7, and FIG. 14 is a cross sectional view as seen from a line G—G in FIG. 13. A side-sill closed cross sectional portion 62 extending in the vehicle longitudinal direction is formed by a side-sill outer 60 and a side-sill inner 61 jointed to the inner side of the side-sill outer 60. And a lower line portion of the above-mentioned annular reinforcement 35 is arranged so as to be jointed between the side-sill outer 60 and the side-sill inner 61 within the side-sill closed cross sectional portion 62.

It is to be noted that the above-mentioned side-sill 26 constituted by the side-sill outer 60 and the side-sill inner 61 is a vehicle body rigid member having a closed cross sectional structure and being arranged in the vehicle longitudinal direction in the side part of the floor panel 27. Floor cross members 63 and 64 (so-called No. 2 cross member and No. 3 cross member) extending in the vehicle widthwise direction are mounted to front and rear parts of the above-mentioned floor panel 27 to be apart from each other.

Front and rear side-sill reinforcements 65 and 66 connecting the annular reinforcement 35 to the side-sill inner 61 within the side-sill closed cross sectional portion 62 so as to form nodes are provided in such a manner as to oppose to the respective floor cross members 63 and 64. Thereby, an improvement of body rigidity against a side collision is intended.

A middle side-sill reinforcement 67 connecting the annular reinforcement 35 to the side-sill inner 61 so as to form a node is provided at a position which is a predetermined amount forward offset with respect to the rear side-sill reinforcement 66 opposing to the floor cross member 64, and which is a predetermined amount rearward offset with respect to the front side-sill reinforcement 65 opposing to the floor cross member 63. These middle and rear side-sill reinforcements 67 and 66 are connected by a bracket 68 formed in a reverse U-shape in a plan view. And a striker 69 for locking the lower part of the rear door 3 is provided between the above-mentioned side-sill reinforcements 67 and 66 and the vicinity thereof. It is to be noted that the striker 69 is structured such as to engage the latch of the lock member 17 shown in FIG. 1.

Further, a seat rail member 70 corresponding to a connection member for connecting between the floor cross member 63 and the middle side-sill reinforcement 67 is provided in the inner side of the above-mentioned side-sill inner 61.

The seat rail member 70 is structured such as to support a seat arranged on an upper surface of the floor panel 27. And a front part of the seat rail member 70 is arranged on an upper surface of a seat rail bracket 71 (refer to FIG. 14) mounted between the floor cross member 63 and the side-sill inner 61.

Figure 15:
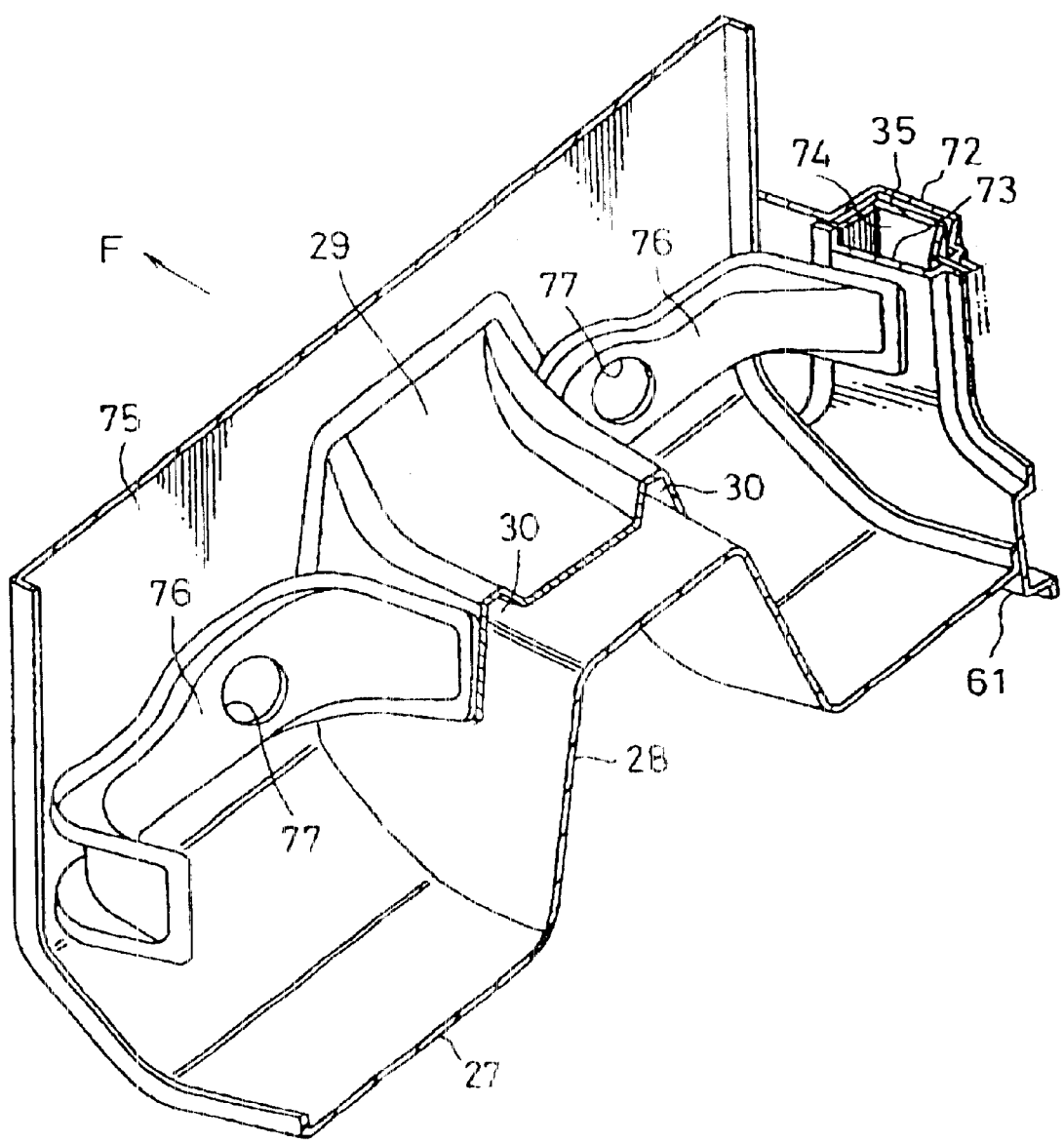
FIG. 15 is a perspective view showing a front body structure of a vehicle.

FIG. 15 shows a cross sectional structure of the hinge pillar. It is to be noted that FIG. 16 corresponds to a plan view of FIG. 15. A closed cross sectional portion 74 extending in the vertical direction is formed by a hinge pillar outer 72 and a hinge pillar inner 73 connected to an inner side of the hinge pillar outer 72. And the above-mentioned annular reinforcement 35 is arranged so as to be jointed between the hinge pillar outer 72 and the hinge pillar inner 73 within the closed cross sectional portion 74.

Figure 16:
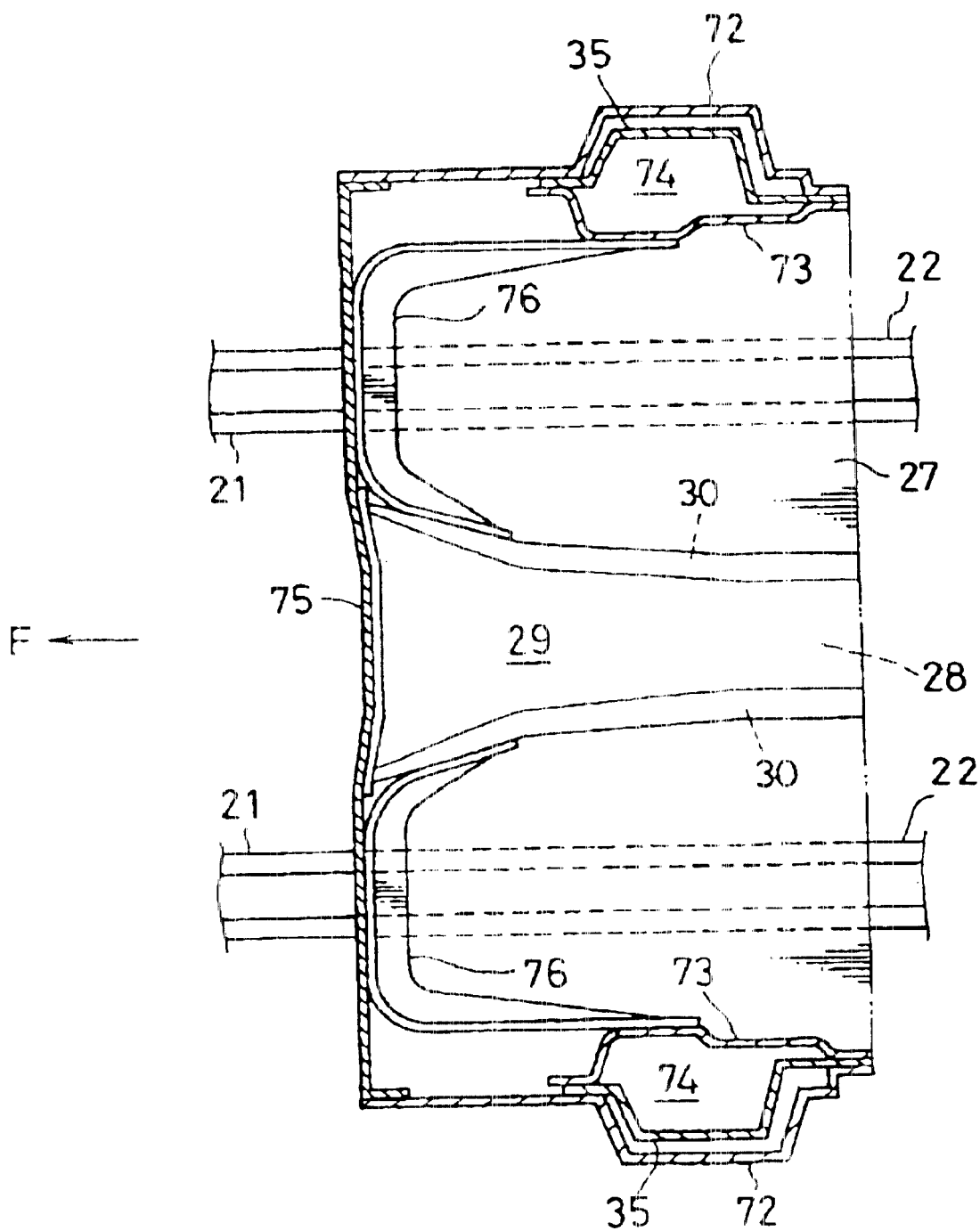
FIG. 16 is a cross sectional view showing a major portion of FIG. 15.

Further, the front body structure of the vehicle is shown in both FIGS. 15 and 16. The front body of the vehicle is provided with the dash lower panel 75 extending in the vertical direction and constructing the front end wall of the crew's cabin, and the floor panel 27 continuously extending rearward from the dash lower panel 75. The front end portion 29a of the above-mentioned tunnel member 29 is connected to the dash lower panel 75.

The tunnel portion 28 protruding upward and extending in the vehicle longitudinal direction is provided in the substantially center portion of the floor panel 27 as mentioned above. And a dash cross member 76 is provided on a surface in the crew's cabin side of the above-mentioned dash lower panel 75. The dash cross members 76 are arranged so as to constitute a pair of right and left pieces. And each dash cross member is structured such that one end portion in an inner side in the vehicle widthwise direction is jointed to a side surface of the tunnel portion 28 via a skirt portion of the tunnel member 29. A middle portion of the dash cross member extends in the vehicle widthwise direction along the dash lower panel 75, and another end portion in an outer side in the vehicle widthwise direction is connected to the hinge pillar inner 73.

That is, the tunnel side end portion of each of the right and left dash cross members 76 mentioned above is jointed to the tunnel member 29 provided on the upper surface of the above-mentioned tunnel portion 28.

Further, the end portion in the hinge pillar side of the above-mentioned dash cross member 76 is jointed to the annular reinforcement 35 via the hinge pillar inner 73.

The above-mentioned dash cross member 76 is formed substantially in a reverse U-shape in a plan view. And a pair of right and left dash cross members 76 and 76 are provided, as shown in FIG. 15, so as to extend substantially in a horizontal vehicle widthwise direction at a predetermined height position upward apart from a height of a horizontal part of the floor panel 27.

Further, an opening portion 77 for inserting and passing a steering shaft system (in particular, an intermediate shaft and a universal joint) therethrough is formed in each of the dash cross member 76 and 76 mentioned above.

Furthermore, as shown in FIG. 16, the rear end of the front side-frame 21 is connected to such a portion that corresponds to a connected portion by the above-mentioned dash cross member 76 in the outer side (engine room side) surface of the above-mentioned dash lower panel 75.

In FIG. 7, a reference numeral 78 denotes a mounting portion for the front door hinge 4 which is provided in a front line portion of the door opening 14, and a reference numeral 79 denotes a mounting portion for the rear door hinge 5 which is provided in a rear line portion of the door opening 14. The front door 2 is supported to the front line portion of the door opening 14 via the front door hinge 4 shown in FIG. 1 so as to freely open and close. The rear door 3 is supported to the rear line portion via the rear door hinge 5 shown in FIG. 1 so as to freely open and close. And the respective doors 2 and 3 having the free-style type structure are opened and closed by setting the side-sill 26 to the lower line.

It is to be noted that, in the drawings, reference symbol F denotes a vehicle forward side, and reference symbol OUT denotes a vehicle outer side.

The first embodiment is structured in the manner mentioned above, and a description will be given of the function and advantages thereof below.

In accordance with the first embodiment, there is provided a front body structure of a vehicle including: a dash lower panel 75 extending in a vertical direction and constituting a front end wall of a crew's cabin; a floor panel 27 continuously extending rearward from the dash lower panel 75; and a tunnel portion 28 protruding upward and extending in a longitudinal direction of the vehicle, the tunnel portion 28 being provided in a substantially center portion of the floor panel 27, wherein the dash lower panel 75 is provided with dash cross members 76, 76 structured such that one end portion is jointed to a side surface of the tunnel portion 28, a middle portion extends in the vehicle widthwise direction along the dash lower panel 75, and another end portion is connected to a hinge pillar (a hinge pillar outer 72 and a hinge pillar inner 73).

According to the structure mentioned above, since the dash cross member 76 is arranged among the dash lower panel 75, the tunnel portion 28 and the hinge pillar 72 and 73, it is possible to enhance the body durability by dispersing an input load of the dash lower panel 75 into the tunnel portion 28 and the hinge pillar 72, 73 via the dash cross member 76, at a time of a head-on collision of the vehicle. As a result, it is possible to restrain a backward movement of the dash lower panel 75. Also, at a time of a side collision of the vehicle, it is possible to restrain an intrusion amount of a side-sill 26 or doors 2, 3 into the crew's cabin by dispersing a side collision load into the tunnel portion 28 via the dash cross member 76.

In the present embodiment, the above-mentioned dash cross member 76 is provided so as to extend substantially in a horizontal vehicle widthwise direction at a predetermined height position upward apart from a height of a horizontal part of the floor panel 27.

According to the structure mentioned above, since the height position of the dash cross member 76 is set to the above-mentioned predetermined height position, it is possible to enhance the rigidity (or strength) of the hinge pillar 72, 73 by means of the dash cross member 76. Especially, it is possible to enhance the durability at a time of a side collision of the vehicle.

Further, in the present embodiment, a tunnel member 29 extending in the longitudinal direction of the vehicle along the tunnel portion 28 to form a closed cross section is provided on a surface of the tunnel portion 28.

According to the structure mentioned above, it is possible to enhance the rigidity of the floor and the vehicle body by arranging the tunnel member 29.

Furthermore, in the present embodiment, the dash cross members 76 are arranged so as to constitute a pair of right and left pieces, and each of the right and left dash cross members 76, 76 is jointed to the tunnel member 29 provided on the surface of the tunnel portion.

According to the structure mentioned above, at a time of a side collision in either right side or left side, it is possible to disperse a collision load to the tunnel member 29 via the hinge pillar 72, 73 and the dash cross member 76, and to receive the collision load by the high rigid tunnel member 29. As a result, it is possible to restrain more effectively the intrusion amount of the side-sill 26 or the doors 2 and 3 into the crew's cabin.

Furthermore, in the present embodiment, the tunnel member 29 is arranged all along the length of the tunnel portion 28 in the longitudinal direction of the vehicle, and a front end portion of said tunnel member 29 is connected to the dash lower panel 75.

According to the structure mentioned above, it goes without saying that it is possible to further enhance the floor rigidity and the vehicle body rigidity by the tunnel member 29 extending all along the length of the tunnel portion 28. Since the front end portion of the tunnel member 29 is connected to the dash lower panel 75, it is possible to remarkably enhance the body durability by dispersing an input load of the dash lower panel 75 into the tunnel portion 28, the tunnel member 29 and the hinge pillar 72, 73 via the dash cross member, at a time of a head-on collision of the vehicle.

Furthermore, in the present embodiment, a rear end of a front side-frame 21 is connected to such a portion that corresponds to a connected portion by the dash cross member 76 in the outer side surface of said dash lower panel 75.

According to the structure mentioned above, at a time of a head-on collision, it is possible to disperse a transmitted load from the front side-frame 21 to the tunnel portion 28 and the hinge pillar 72, 73 via the dash lower panel 75 and the dash cross member 76. Thereby, it is possible to enhance the durability and the rigidity of the vehicle body.

Furthermore, in the present embodiment, a door-opening 14 is formed in a side body of the vehicle, and the door-opening 14 is provided with an annular reinforcement 35 which integrally and continuously extends in an annular manner along the door-opening 14.

According to the structure mentioned above, by arranging the annular reinforcement 35 along the door-opening 14, it is possible to enhance the body rigidity and the torsional rigidity of the vehicle body, and to enhance the operating stability of the vehicle.

Furthermore, in the present embodiment, the end portion in the hinge pillar side of the dash cross member 76 is jointed to the annular reinforcement 35 via the hinge pillar inner 73.

According to the structure mentioned above, by jointing the end portion in the hinge pillar side of the dash cross member 76 to the high rigid annular reinforcement 35, it is possible to remarkably enhance the body rigidity and to enhance the durability against a head-on collision load and a side collision load.

Furthermore, in the present embodiment, the door-opening 14 is opened and closed by a free-style type door consists of a front door 2 supported by a hinge (refer to the front door hinge 4) at a front portion thereof and a rear door 3 supported by a hinge (refer to the rear door hinge 5) at a rear portion thereof.

According to the structure mentioned above, the above-mentioned effects are shown more satisfactorily with respect to a vehicle having free-style type doors. Especially, since the hinge pillar 72, 73 supporting the front portion of the front door 2 via hinges 4, 4 is reinforced by the dash cross member 76, it is possible to secure a sufficient supporting rigidity of the front door 2 even if the door-opening 14 and the front door 2 is set to be large.

Next, a description will be given of a front body structure of a vehicle in accordance with a second embodiment of the present invention with reference to FIGS. 17 to 23. It is to be noted that the same parts in this and the previous embodiment are identified by the same reference numeral and further description thereof will be omitted. Also, it is to be noted that, in the second embodiment, the front body of the vehicle is provided with a same basic construction as the first embodiment. That is, in the second embodiment, the front body of the vehicle is provided with a dash lower panel 75 extending in a vertical direction and constituting a front end wall of a crew's cabin, a floor panel 27 continuously extending rearward from said dash panel, and a tunnel portion 28 protruding upward and extending in a longitudinal direction of the vehicle. The tunnel portion 28 is provided in a substantially center portion of the floor panel 27.

Figure 17:
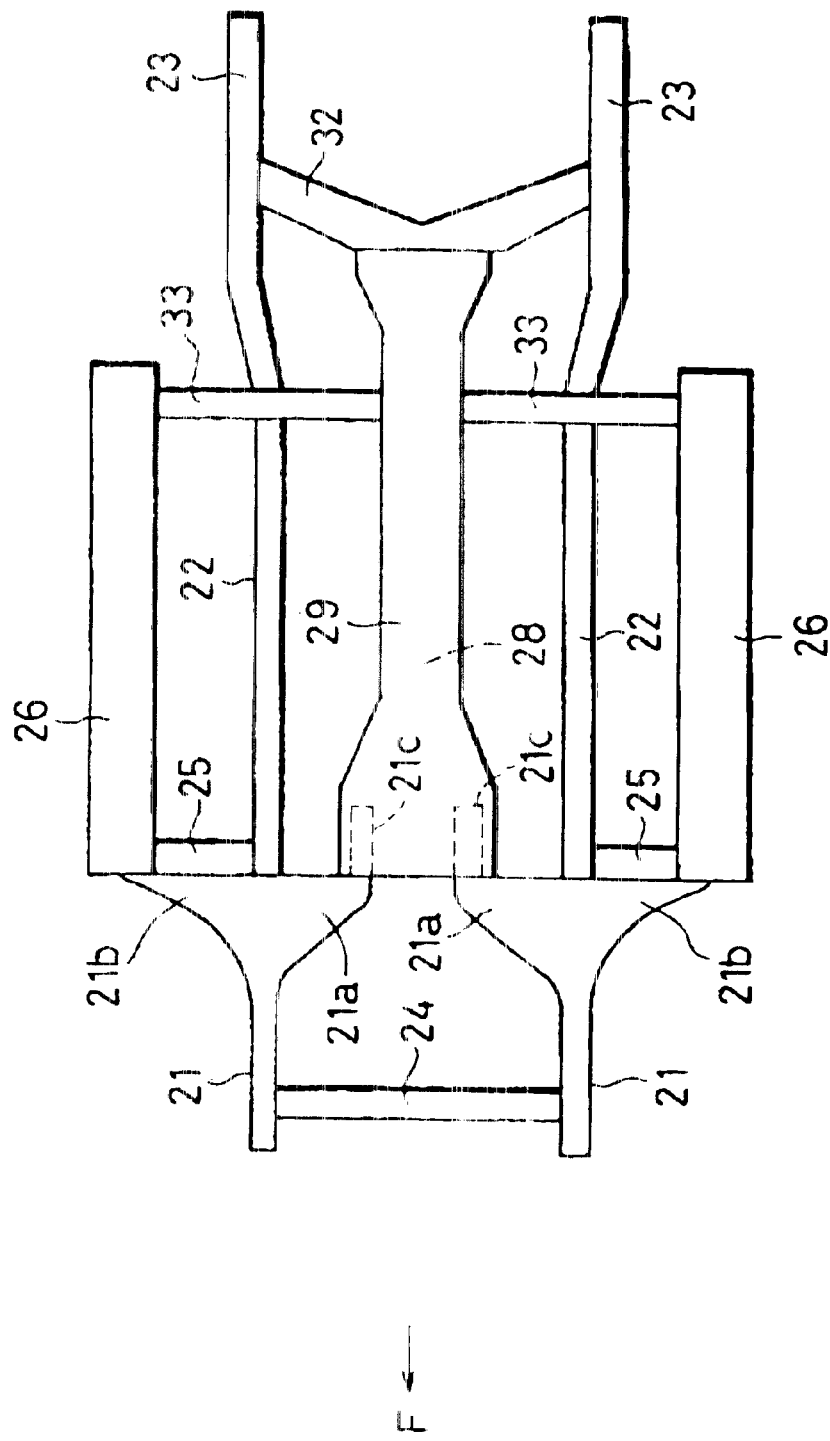
FIG. 17 is a plan view showing a frame structure of a front body structure in accordance with a second embodiment of the present invention.

As shown in a plan view of FIG. 17, the front body of the vehicle is provided with a pair of right and left front side-frames 21 and 21. A main portion (middle portion and front portion) of each of the pair of right and left front side-frames 21 and 21 constitutes a rigid member of the vehicle body which extends in the longitudinal direction of the vehicle. As shown in FIG. 17, a rear end portion of the front side-frame 21 widens in a vehicle widthwise direction. An inner wide portion 21a in inner side in the vehicle widthwise direction and an outer wide portion 21b in outer side in the vehicle width direction are integrated or substantially integrated to each other. Further, an extension portion 21c extending rearward along a back surface of the tunnel portion 28 (refer to FIG. 18) is integrally formed in one wide portion 21a.

Furthermore, as shown in FIG. 17, a floor frame 22 and a rear side-frame 23 are integrally provided in a rearward extending manner on an extension line of the main portion in each of the pair of right and left front side-frames 21 and 21. The above-mentioned floor frame 22 corresponds to a rigid member of the vehicle body which extends in the longitudinal direction of the vehicle. The floor frame 22 is jointed to a back surface of a floor panel 27 (refer to FIG. 18) in an outer side thereof to form a closed cross sectional portion 22a (refer to FIG. 22). The rear end portion of the front side-frame 21 is connected to the floor frame 22.

Figure 19:
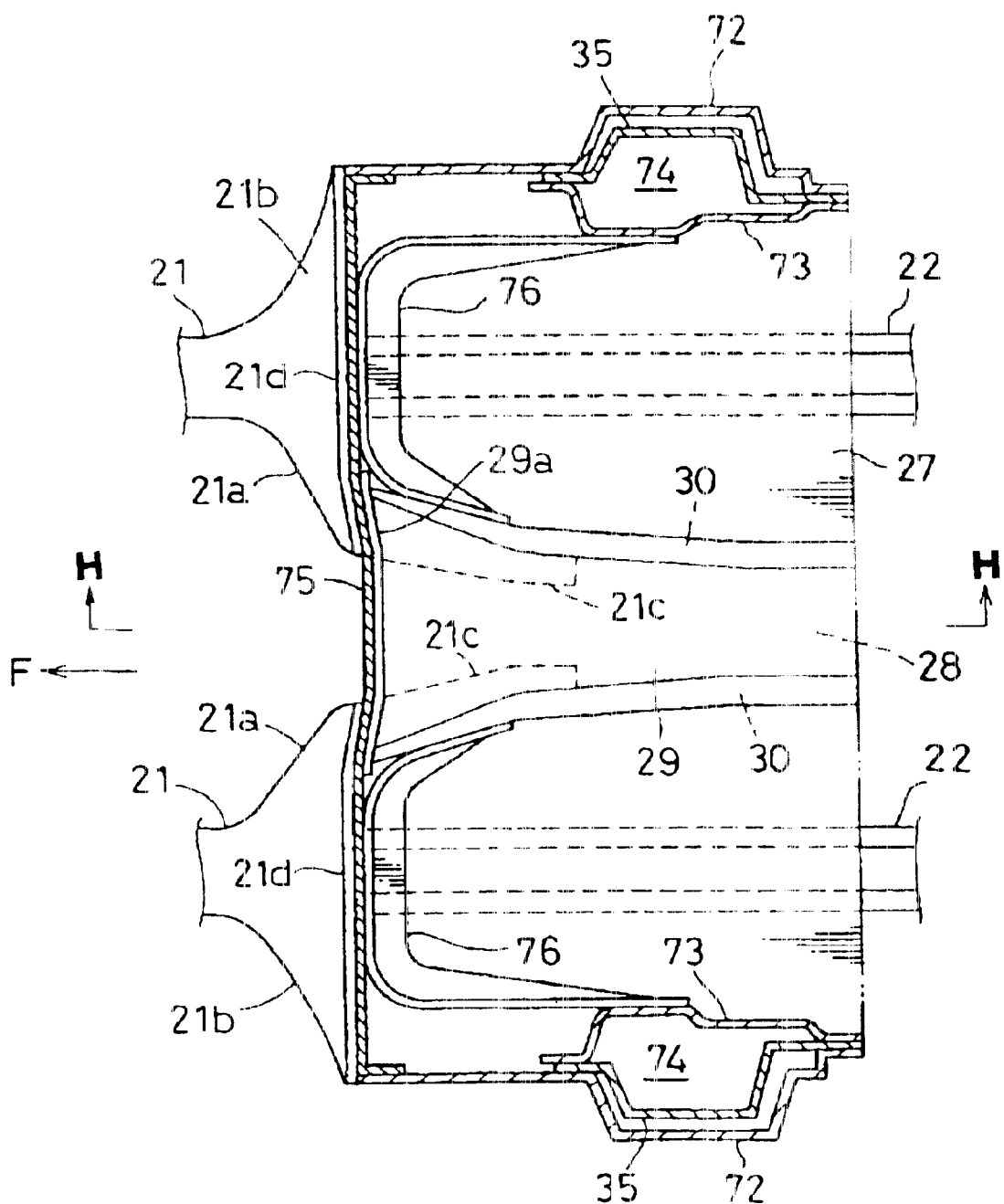
FIG. 19 is a plan view showing the front body structure of the vehicle.
Figure 20:
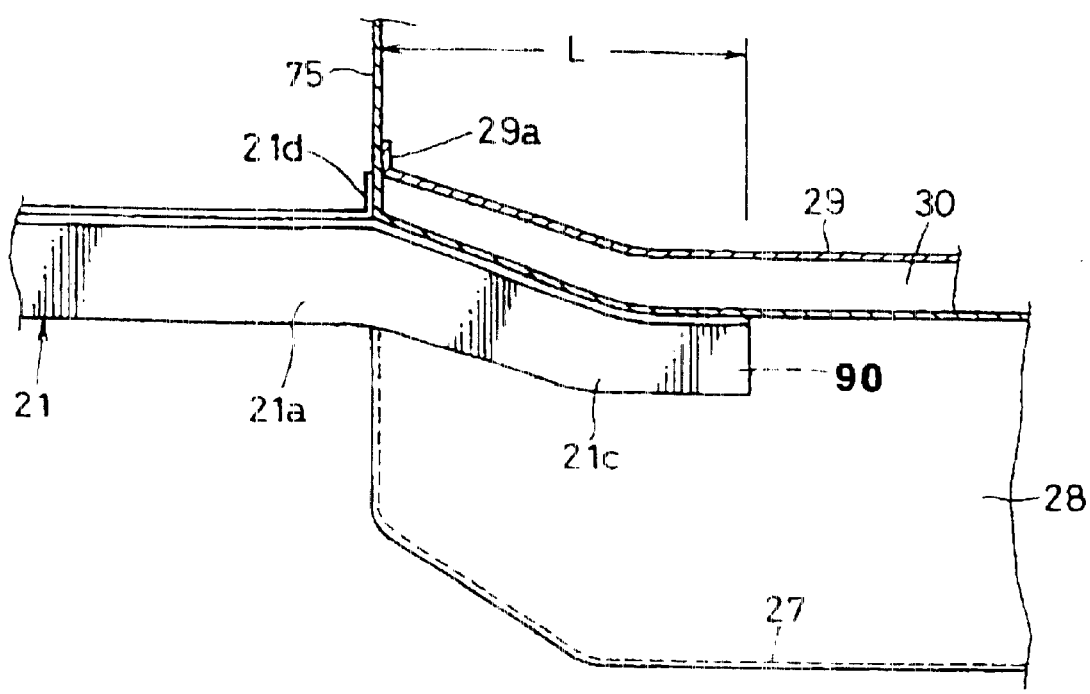
FIG. 20 is a cross sectional view as seen from a line H—H in FIG. 19.
Figure 21:
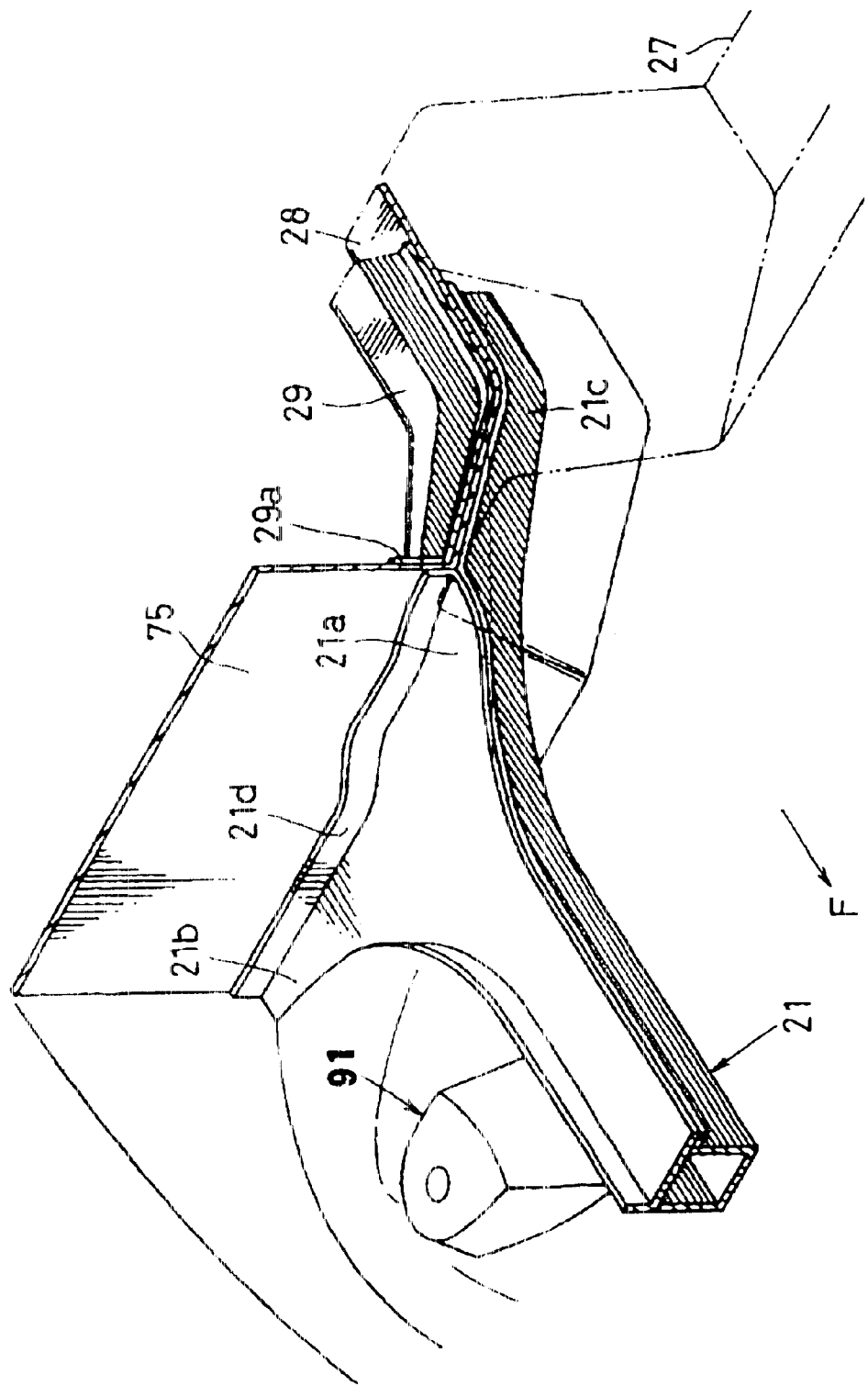
FIG. 21 is a perspective view of FIG. 20.
Figure 22:
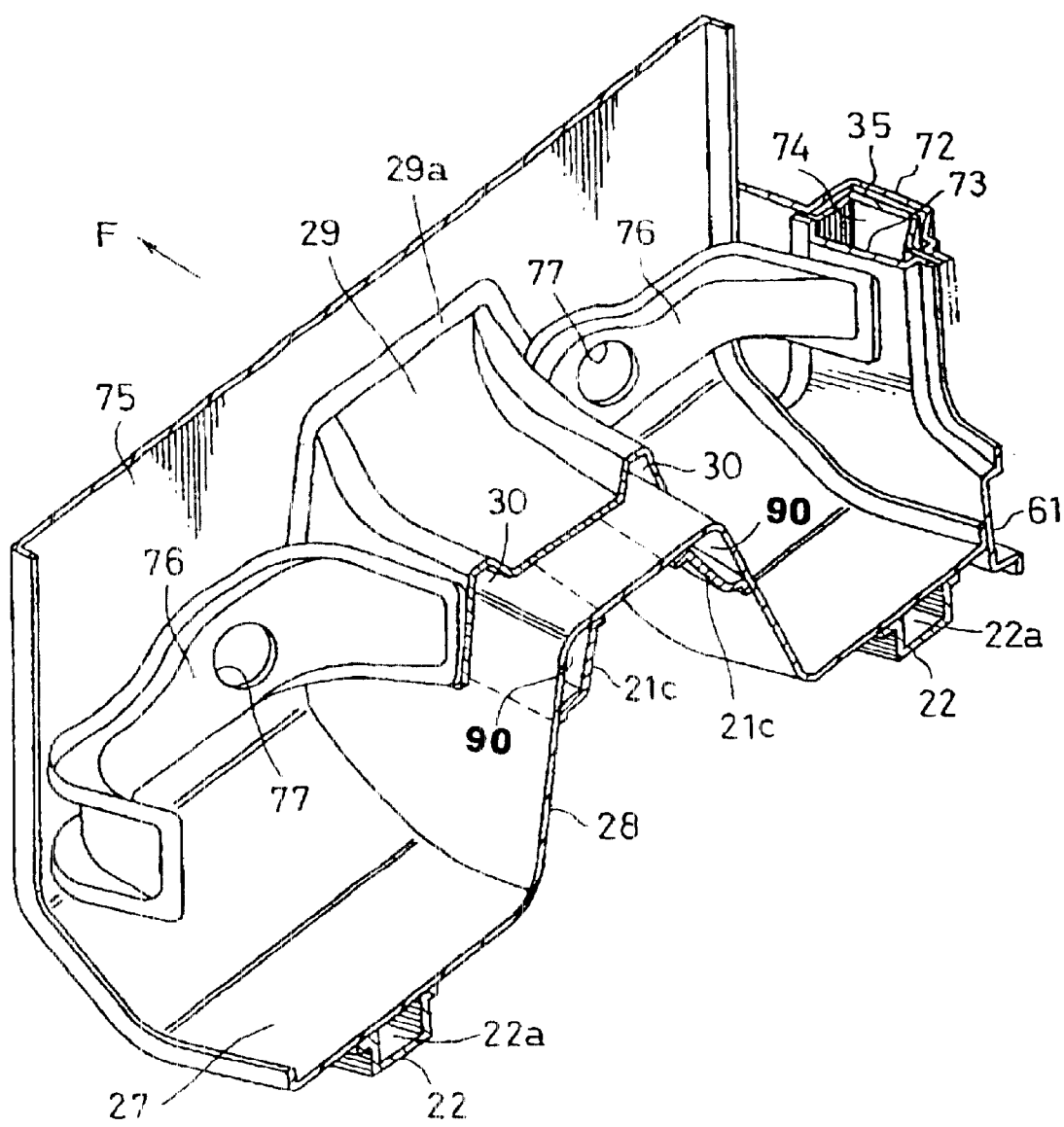
FIG. 22 is a perspective view showing a front body structure of a vehicle.

As shown in FIG. 17, another wide portion 21b of the above-mentioned front side-frame 21 widens in the vehicle widthwise direction along the front side surface of the dash lower panel 75 (refer to FIGS. 19 to 21). And a side portion of the wide portion 21b in the vehicle widthwise direction is jointed to the torque box 25 and the side-sill 26.

It is to be noted that the above-mentioned torque box 25 serves as a rigid member of the vehicle body which extends in the vehicle widthwise direction for the purpose of connecting the floor frame 22 to the side-sill 26.

Figure 18:
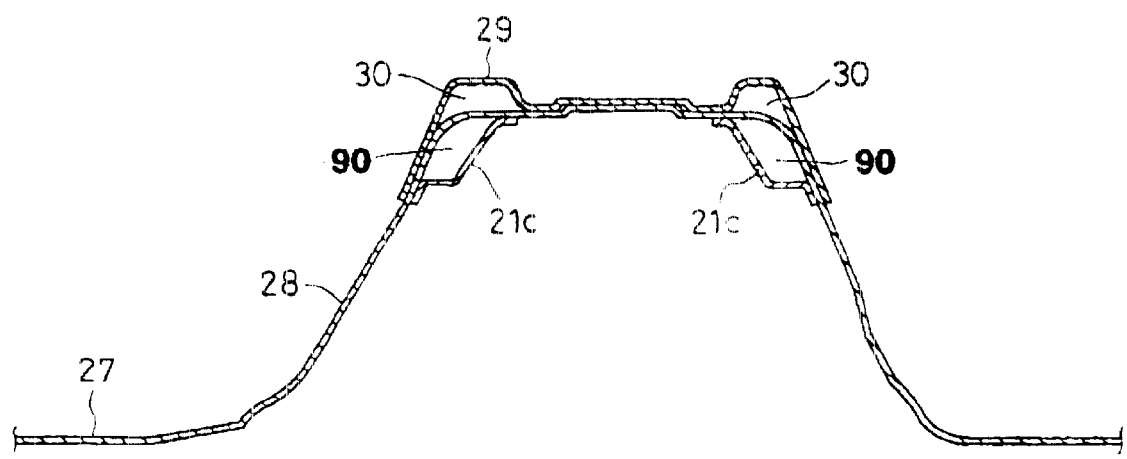
FIG. 18 is a cross sectional view of a tunnel portion.

Furthermore, as shown in FIG. 18, the above-mentioned extension portions 21c and 21c in a pair of right and left front side-frames 21 form a pair of closed cross sectional portions 90 and 90 at both upper corners corner portions) in the outer sides under the back surface of the tunnel portion 28 formed in a hat-like shaped cross section (formed in a portal-like cross section).

As shown in FIG. 17, a front end of the tunnel member 29 jointed and fixed to the upper surface of the tunnel portion 28 all along the length thereof is connected to the rear end portions of the front side-frames 21 and 21 via the dash lower panel 75 (refer to FIGS. 19 to 21). And the rear end of the tunnel member 29 and the rear side-frames 23 and 23 are connected by a rear connection frame 32.

Further, a rear portion of the side-sill 26 is connected to the tunnel portion 28 by a rear cross member 33 extending in the vehicle widthwise direction.

FIG. 19 is a plan view showing an essential portion of the front vehicle body structure, FIG. 20 is a cross sectional view as seen from a line H—H in FIG. 19, and FIG. 21 is a perspective view of FIG. 20. The front body of the vehicle is provided with a dash lower panel 75 extending in the vertical direction and constituting the front end wall of the crew's cabin, and the floor panel continuously extends rearward from the dash panel 75. Further, the tunnel portion 28 is formed on the floor panel 27 as mentioned above.

As shown in FIGS. 19, 20 and 21, the above-mentioned extension portion 21c jointed to a back surface of the tunnel portion 28, and the above-mentioned tunnel member 29 jointed to the upper surface of the tunnel portion 28 are arranged so as to overlap at a predetermined amount L in the longitudinal direction of the vehicle.

In this embodiment, as shown in FIGS. 20 and 21, the above-mentioned front side-frame 21 is constituted by two members comprising an upper member and a lower member which are jointed and fixed to each other. The rear end portion of the upper member is bent upward to integrally form a joint portion 21d, and the joint portion 21d is jointed and fixed to a front surface of the dash lower panel 75. While, the above-mentioned extension portion 21c is integrally formed in the lower member, and the extension portion 21c is jointed to an upper corner of the tunnel portion 28 in the manner mentioned above, thereby, the closed cross section 90 extending in the vehicle longitudinal direction is formed. And, the upper and lower closed cross sections 30 and 90 are connected via both upper corner portions of the tunnel portion 28 in the manner shown in FIG. 18. In this case, in FIG. 21, reference numeral 91 denotes a suspension tower portion.

The second embodiment is structured in the manner mentioned above, and a description will be given of an operation thereof below.

A collision energy at a time of a head-on collision is transmitted from the front side-frame 21 to the floor frame 22, and is transmitted from the wide portion 21b to the side-sill 26 via the torque box 25 or directly. Further, the collision energy is transmitted to the tunnel portion 28 and the tunnel member 29 via the wide portion 21a and the extension portion 21c. Thereby, the collision energy mentioned above is dispersed into the floor frame 22, the side-sill 26, the tunnel portion 28 and the tunnel member 29.

On the other hand, a collision energy at a time of a rear end collision is transmitted from the rear side-frame 23 to the floor frame 22, and is transmitted to the side-sill 26 via the rear cross member 33. Further, the collision energy is transmitted to the tunnel portion 28 and the tunnel member 29 via the connection frame 32. Thereby, the collision energy mentioned above is dispersed into the floor frame 22, the side-sill 26, the tunnel portion 28 and the tunnel member 29.

Figure 23:
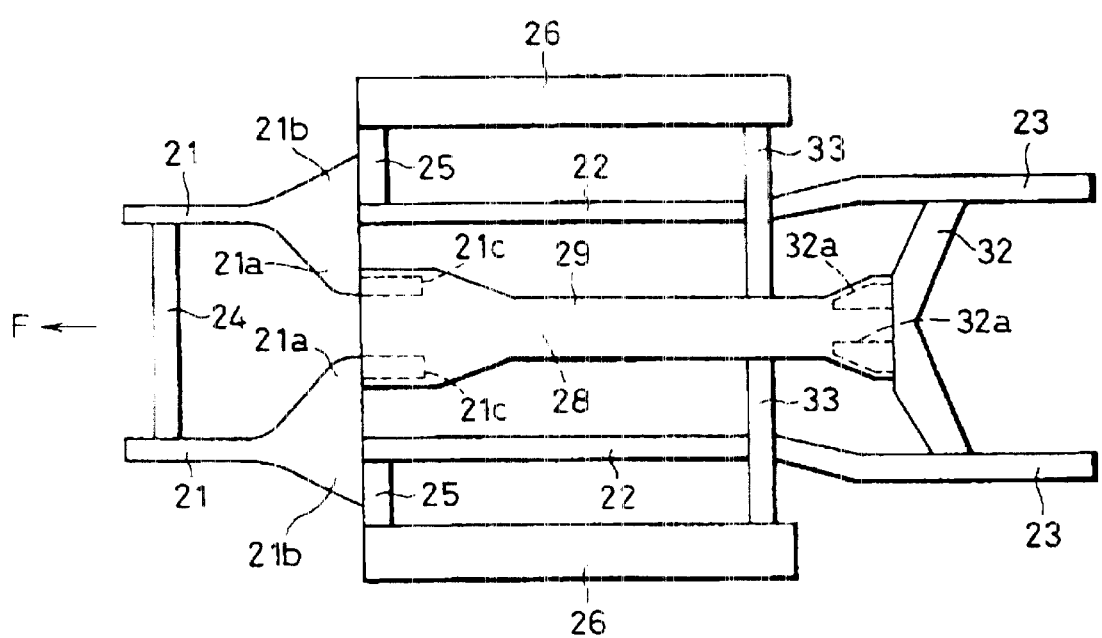
FIG. 23 is a plan view showing a frame structure of a front body structure in accordance with a modified embodiment.

FIG. 23 shows a modified embodiment of the front body structure of the vehicle. In this case, another wide portion 21b of the front side-frame 21 is extended outward in the vehicle widthwise direction along the front outer side surface of the dash lower panel 75 (refer to FIGS. 19 to 21). And the widthwise side portion of the above-mentioned wide portion 21b is jointed to the torque box 25. Further, there are provided extension portions 32a and 32a extending forward from the rear connection frame 32. And, those extension portions 32a and 32a are jointed to the tunnel portion 28 so as to form a pair of closed cross sectional portions with respect to both upper corners in the back surface of the tunnel portion 28. Thereby, it is also possible to improve the durability at a time of the rear surface collision.

Even by structuring in the manner mentioned above, the other structures, operations and effects are substantially the same as those of the previous embodiments. Therefore, the same reference numerals are attached to the same elements in FIG. 23 as those in FIG. 17, and a detailed description thereof will be omitted.

As explained above, in the second embodiment, the front body of the vehicle is provided with the dash lower panel 75 extending in the vertical direction and constituting the front end wall of the crew's cabin, and the floor panel 27 continuously extending rearward from the dash lower panel 75. The front vehicle body is further provided with the tunnel portion 28 protruding upward and extending in the longitudinal direction of the vehicle in the substantially center portion of the floor panel 27. The front side-frame 21 extending in the vehicle longitudinal direction is arranged in the forward area of the dash lower panel 75. Further, the rear end portion of the front side-frame 21 widens in the vehicle widthwise direction so as to extend rearward along the back surface of the tunnel portion 28 (refer to the extension portion 21c), to form the closed cross sectional portion 90 with respect to the tunnel portion 28, by being jointed to the tunnel portion 28.

In accordance with this structure, the rear end portion of the front side-frame 21 widening in the vehicle widthwise direction is jointed to the back surface of the tunnel portion 28, and the closed cross sectional portion 90 is formed between the rear end portion (refer to the extension portion 21c) of the front side-frame 21 and the tunnel portion 28. Therefore, it is possible to transmit a load at a time of a head-on collision from the front side-frame 21 to the tunnel portion 28 in spite of a simple structure, thereby, it is possible to improve a durability at a time of a collision.

Further, the tunnel member 29 extending in the longitudinal direction of the vehicle along the tunnel portion 28 to form the closed cross sectional portion 30 is provided in the surface of the tunnel portion 28.

In accordance with this structure, it is possible to transmit the load at a time of the head-on collision to the tunnel portion 28 and the tunnel member 29 by arranging the tunnel member 29, whereby it is possible to further improve the durability at a time of the collision. And simultaneously it is possible to improve a floor rigidity and a vehicle body rigidity by arranging the above-mentioned tunnel member 29, and it is further possible to improve a torsional rigidity of the front body of the vehicle.

Furthermore, the rear end portion (refer to the extension portion 21c) of the front side-frame 21 jointed to the back surface of the tunnel portion 28 and the tunnel member 29 jointed to the upper surface of the tunnel portion 28 are arranged so as to overlap in the longitudinal direction of the vehicle.

In accordance with this structure, the durability at a time of the collision is further improved by the overlapping structure as mentioned above.

In addition, the rear end portion (refer to the wide portion 21b) of the front side-frame 21 widens in the vehicle widthwise direction along the outer side surface of the dash lower panel 75 to be jointed at least to the torque box 25.

In accordance with this structure, collision load at a time of a collision is transmitted to the side-sill 26 via the torque box 25, and the load is also transmitted to the tunnel portion 28 and the tunnel member 29. Therefore, it is possible to disperse the collision load, thereby it is possible to restrict the deformation of the vehicle body.

Further, the rear end portion (refer to the wide portion 21b) of the front side-frame 21 widens in the vehicle widthwise direction along the outer side surface of the dash lower panel 75. And, the widthwise side portion of the above-mentioned wide portion is jointed to the side-sill 26 extending in the longitudinal direction of the vehicle.

In accordance with this structure, since the collision load at a time of the collision is transmitted to the side-sill 26, the tunnel portion 28 and the tunnel member 29, thereby making it possible to disperse the collision load, it is possible to restrict the deformation of the vehicle body.

Furthermore, the rear end portion of the front side-frame 21 is connected to the floor frame 22 jointed to the back surface of the floor panel 27 to form the closed cross sectional portion 22a (refer to FIG. 22) and extend in the longitudinal direction of the vehicle.

In accordance with this structure, the front side-frame 21 is connected to the floor frame 22 extending in the longitudinal direction of the vehicle. Therefore, it is possible to transmit and disperse the collision load at a time of the collision not only to the tunnel portion 28 but also to the floor frame 22 forming the closed cross sectional portion 22a with respect to the floor panel 27. As a result, it is possible to restrict the deformation of the vehicle body further well.

Furthermore, the above-mentioned tunnel portion 28 is formed in the hat-like shaped cross section, and the front side-frames 21 are constituted by a pair of right and left frames. Further, the rear end portions (refer to the extension portions 21c and 21c) of the pair of right and left front side-frames 21 and 21 form a pair of closed cross sectional portions 90 and 90 in both corners in the upper portion of the tunnel portion 28.

In accordance with this structure, a pair of right and left closed cross sectional portions 90 and 90 are formed by the rear end portions (refer to the extension portions 21c and 21c) of the pair of right and left front side-frames 21 and 21, and both corners in the upper part of the back surface of the tunnel portion 28 formed in the hat-like shaped cross section (the portal cross section). By the closed cross sectional structure, it is possible to enhance the vehicle body strength and to intend to improve the durability at a time of the collision.

Furthermore, the tunnel member 29 is arranged all along the length of the tunnel portion 28, and the front end 29a of the tunnel member 29 is connected to the dash lower panel 75.

In accordance with this structure, it goes without saying that it is possible to further improve the floor rigidity and the vehicle body rigidity by the tunnel member 29 extending all along the length of the tunnel portion 28. Further, since the front end 29a of the tunnel member 29 is connected to the dash lower panel 75, it is possible to restrict a backward movement of the (dash lower panel 75 at a time of the head-on collision of the vehicle.

As shown in the second embodiment mentioned above, the dash floor panel 75 may be provided with the dash cross members 76 and 76. One end portion of the dash cross member is jointed to the side surface of the tunnel portion 28, the middle portion extends in the vehicle widthwise direction along the dash lower panel 75, and another end portion is connected to the hinge pillar (refer to the hinge pillar outer 72 and the hinge pillar inner 73). It is possible, at a time of the head-on collision of the vehicle, to disperse the load inputted to the dash lower panel 75 into the tunnel portion 28 and the hinge pillar 72 and 73 via the dash cross member 76, so as to further well improve the durability. As a result, it is possible to further restrict an amount of backward movement of the dash lower panel 75.

Furthermore, at a time of the side collision of the vehicle, the side collision load is dispersed into the tunnel portion 28 and the tunnel member 29 via the dash cross member 76. As a result, it is possible to restrict an amount of intrusion of the side-sill 26 and the doors 2 and 3 into the crew's cabin.

In accordance with the second embodiment, the front flame extending in the vehicle longitudinal direction is arranged in the forward area of the dash panel. And the rear end portion of the front frame widens in the vehicle widthwise direction to extend rearward along the back surface of the tunnel portion, and forms the closed cross section with respect to the tunnel portion by being jointed to the tunnel portion. Therefore, it is possible to transmit the collision load at a time of the head-on collision to the tunnel portion in spite of the simple structure, and it is possible to intend to improve the durability at a time of the collision.

What is claimed is:

1. A front body structure of a vehicle comprising:
a dash panel extending in a vertical direction and forming a front end wall;
a floor panel continuously extending rearward from said dash panel; and
a tunnel portion protruding upward and extending in a longitudinal direction of the vehicle, said tunnel portion being provided in a substantially center portion of said floor panel,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

2. A front body structure of a vehicle according to claim 1, wherein said dash cross member is provided so as to extend substantially in a horizontal vehicle widthwise direction at a predetermined height position upward apart from a height of a horizontal part of said floor panel.

3. A front body structure of a vehicle according to claim 1, further comprising a tunnel member provided on a surface of said tunnel portion and extending in the longitudinal direction of the vehicle along said tunnel portion to form a closed cross section.

4. A front body structure of a vehicle comprising:
a dash panel extending in a vertical direction forming a front end wall;
a floor panel continuously extending rearward from said dash panel;
a tunnel portion protruding upward and extending in a longitudinal direction of the vehicle, said tunnel portion being provided in a substantially center portion of said floor panel;
a tunnel member provided on a surface of said tunnel portion and extending in the longitudinal direction of the vehicle along said tunnel portion to form a closed cross section; and
a plurality of dash cross members arranged so as to constitute a pair of right and left dash cross members, and each of the right and left dash cross members is jointed to said tunnel member provided on the surface of said tunnel portion, each said dash cross member being structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

5. A front body structure of a vehicle according to claim 3, wherein said tunnel member is arranged all along the length of the tunnel portion in the longitudinal direction of the vehicle, and a front end portion of said tunnel member is connected to said dash panel.

6. A front body structure of a vehicle comprising:
a dash panel extending in a vertical direction and forming a front end wall;
a floor panel continuously extending rearward from said dash panel; and
a tunnel portion protruding upward and extending in a longitudinal direction of the vehicle, said tunnel portion being provided in a substantially center portion of said floor panel,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel and wherein a rear end of a front side-frame is connected to a portion that corresponds to a connected portion by said dash cross member in the outer side surface of said dash panel.

7. A front body structure of a vehicle according to claim 1, wherein a door-opening is formed in a side portion of said vehicle, and said door-opening is provided with an annular reinforcement which integrally and continuously extends in an annular manner along said door-opening.

8. A front body structure of a vehicle according to claim 7, wherein an end portion in a hinge pillar side of each said dash cross member is jointed to said annular reinforcement via a hinge pillar inner.

9. A front body structure of a vehicle according to claim 7, wherein said door-opening is opened and closed by a free-style type door comprising a front door supported by a hinge at a front portion thereof and a rear door supported by a hinge at a rear portion thereof.

10. A front body structure of a vehicle comprising:
a dash panel extending in a vertical direction and forming a front end wall;
a floor panel continuously extending rearward from said dash panel;
a tunnel portion protruding upward and extending in a longitudinal direction of the vehicle, said tunnel portion being provided in a substantially center portion of said floor panel;
a front frame extending in the longitudinal direction of the vehicle arranged in a forward area of said dash panel; and
a rear end portion of said front frame widening in a vehicle widthwise direction to extend rearward along a back surface of said tunnel portion, and jointed to said tunnel portion to form a closed cross section with respect to the tunnel portion,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

11. A front body structure of a vehicle comprising:
a dash panel extending in a vertical direction and forming a front end wall;
a floor panel continuously extending rearward from said dash panel;
a tunnel portion protruding upward and extending in a longitudinal direction of the vehicle, said tunnel portion being provided in a substantially center portion of said floor panel;
a tunnel member provided on a surface of said tunnel portion and extending in the longitudinal direction of the vehicle along said tunnel portion to form a closed cross section;
a front frame extending in the longitudinal direction of the vehicle arranged in a forward area of said dash panel; and
a rear end portion of said front frame, said rear end portion widening in a vehicle widthwise direction to extend rearward along a back surface of said tunnel portion, and jointed to said tunnel portion to form a closed cross section with respect to the tunnel portion,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

12. A front body structure of a vehicle comprising:
a dash panel extending in a vertical direction and forming a front end wall;
a floor panel continuously extending rearward from said dash panel;
a tunnel portion protruding upward and extending in a longitudinal direction of the vehicle, said tunnel portion being provided in a substantially center portion of said floor panel;
a tunnel member provided on a surface of said tunnel portion and extending in a longitudinal direction of the vehicle along said tunnel portion to form a closed cross section;
a front frame extending in the longitudinal direction of the vehicle arranged in a forward area of said dash panel; and
a rear end portion of said front frame widening in a vehicle widthwise direction to extend rearward along a back surface of said tunnel portion the front frame rear end portion being jointed to the back surface of said tunnel portion to form a closed cross section with respect to said tunnel portion, and the tunnel member being jointed to the surface of said tunnel portion, both being arranged so as to overlap in the longitudinal direction of the vehicle,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

13. A front body structure of a vehicle comprising:
a dash panel extending in a vertical direction and forming a front end wall;
a floor panel continuously extending rearward from said dash panel;
a tunnel portion protruding upward and extending in a longitudinal direction of the vehicle, said tunnel portion being provided in a substantially center portion of said floor panel;
a front frame extending in the longitudinal direction of the vehicle arranged in a forward area of said dash panel; and
a rear end portion of said front frame widening in a vehicle widthwise direction along the outer side surface of the dash panel to extend rearward along a back surface of said tunnel portion, said rear end portion being jointed to said tunnel portion to form a closed cross section with respect to the tunnel portion and to a torque box,
wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

14. A front body structure of a vehicle comprising:
a dash panel extending in a vertical direction and forming a front end wall;

a floor panel continuously extending rearward from said dash panel;

a tunnel portion protruding upward and extending in a longitudinal direction of the vehicle, said tunnel portion being provided in a substantially center portion of said floor panel;

a front frame extending in the longitudinal direction of the vehicle arranged in a forward area of said dash panel; and a rear end portion of said front frame widening in a vehicle widthwise direction along the outer side surface of the dash panel to extend rearward along a back surface of said tunnel portion, said rear end portion being jointed to said tunnel portion to form a closed cross section with respect to the tunnel portion; and wherein the side portion of the front frame rear end portion in the vehicle widthwise direction is jointed to a side-sill portion extending in the longitudinal direction of the vehicle, wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

15. A front body structure of a vehicle comprising:

a dash panel extending in a vertical direction and forming a front end wall;

a floor panel continuously extending rearward from said dash panel;

a tunnel portion protruding upward and extending in a longitudinal direction of the vehicle, said tunnel portion being provided in a substantially center portion of said floor panel;

a front frame extending in the longitudinal direction of the vehicle arranged in a forward area of said dash panel; and a rear end portion of said front frame widening in a vehicle widthwise direction to extend rearward along a back surface of said tunnel portion, the rear end portion of said front frame being connected to the floor frame which is jointed to a back surface of the floor panel and jointed to said tunnel portion to form a closed cross sectional portion with respect to the tunnel portion and extending in the longitudinal direction of the vehicle, wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

16. A front body structure of a vehicle comprising:

a dash panel extending in a vertical direction and forming a front end wall;

a floor panel continuously extending rearward from said dash panel;

a tunnel portion protruding upward and extending in a longitudinal direction of the vehicle, said tunnel portion being provided in a substantially center portion of said floor panel said tunnel portion having a hat-like shaped cross section:

a front frame extending in the longitudinal direction of the vehicle arranged in a forward area of said dash panel, said front frame comprising a pair of right and left frames; and a rear end portion of each of said right and left front frames widening in a vehicle widthwise direction to extend rearward along a back surface of said tunnel portion, and jointed to said tunnel portion to form a pair of closed cross sectional portions in both corners in an upper part of said tunnel portion, wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

17. A front body structure of a vehicle comprising:

a dash panel extending in a vertical direction and forming a front end wall;

a floor panel continuously extending rearward from said dash panel;

a tunnel portion protruding upward and extending in a longitudinal direction of the vehicle, said tunnel portion being provided in a substantially center portion of said floor panel;

a tunnel member provided on a surface of said tunnel portion and extending in a longitudinal direction of the vehicle along the entire length of the tunnel portion to form a closed cross section and a front end portion of said tunnel member being connected to said dash panel;

a front frame extending in the longitudinal direction of the vehicle arranged in a forward area of said dash panel; and a rear end portion of said front frame widening in a vehicle widthwise direction to extend rearward along a back surface of said tunnel portion, and jointed to said tunnel portion to form a closed cross section with respect to the tunnel portion, wherein said dash panel is provided with at least one dash cross member structured such that one end portion is jointed to a side surface of said tunnel portion, a middle portion extends in the vehicle widthwise direction along said dash panel, and another end portion is connected to a hinge pillar inner of the vehicle, the middle portion of the dash cross member forming a closed cross section together with the dash panel.

* * * * *